United States Patent

Kitamura

(10) Patent No.: US 9,912,557 B2
(45) Date of Patent: Mar. 6, 2018

(54) NODE INFORMATION DETECTION APPARATUS, NODE INFORMATION DETECTION METHOD, AND PROGRAM

(71) Applicant: NEC Corporation, Tokyo (JP)

(72) Inventor: Hiroshi Kitamura, Tokyo (JP)

(73) Assignee: NEC Corporation, Tokyo (JP)

(*) Notice: Subject to any disclaimer, the term of this patent is extended or adjusted under 35 U.S.C. 154(b) by 170 days.

(21) Appl. No.: 14/770,667

(22) PCT Filed: Feb. 7, 2014

(86) PCT No.: PCT/JP2014/052862
§ 371 (c)(1),
(2) Date: Aug. 26, 2015

(87) PCT Pub. No.: WO2014/132774
PCT Pub. Date: Sep. 4, 2014

(65) Prior Publication Data
US 2016/0020971 A1    Jan. 21, 2016

(30) Foreign Application Priority Data

Mar. 1, 2013  (JP) .................. 2013-040813

(51) Int. Cl.
*H04L 29/06* (2006.01)
*H04L 29/12* (2006.01)
*H04L 12/26* (2006.01)

(52) U.S. Cl.
CPC ........ *H04L 43/065* (2013.01); *H04L 63/1433* (2013.01); *H04L 61/2092* (2013.01); *H04L 61/6059* (2013.01)

(58) Field of Classification Search
CPC ............... H04L 43/065; H04L 63/1433; H04L 61/2092; H04L 61/6059
(Continued)

(56) References Cited

U.S. PATENT DOCUMENTS 7,519,954 B1    4/2009 Beddoe et al.
2003/0195861 A1  10/2003 McClure et al.
(Continued)

FOREIGN PATENT DOCUMENTS

JP    2004-128727 A     4/2004
JP    2005-333684 A    12/2005
(Continued)

OTHER PUBLICATIONS

Christoph Eckstein, OS Fingerprinting with IPv6, Sep. 21, 2011, SANS Institute Reading Room.*
(Continued)

*Primary Examiner* — Patrice Winder
*Assistant Examiner* — Lam Duong
(74) *Attorney, Agent, or Firm* — Wilmer Cutler Pickering Hale and Dorr LLP

(57) ABSTRACT

A node information detection apparatus identifies the type of an Operating System (OS) operating on a node that is connected via a network. A message transmission unit transmits a transmission message to be responded to through IPv6 protocol stack processing that is executed at a kernel level implemented in at least one or more types of OSs. A message reception unit receives a response message from the node that received the transmission message. An OS type identification unit identifies the type of OS operating on the node on the basis of the contents of the response message received from the node or on the basis of presence or absence of a response message from the node.

20 Claims, 13 Drawing Sheets

(58) Field of Classification Search
USPC .......................................................... 709/224
See application file for complete search history.

(56) References Cited

U.S. PATENT DOCUMENTS

| | | |
|---|---|---|
| 2003/0217039 A1 | 11/2003 | Kurtz et al. |
| 2004/0078384 A1 | 4/2004 | Keir et al. |

FOREIGN PATENT DOCUMENTS

| | | |
|---|---|---|
| JP | 2006-287299 A | 10/2006 |
| JP | 2006-319863 A | 11/2006 |
| JP | 2009-100363 A | 5/2009 |
| JP | 2010-063110 A | 3/2010 |
| JP | 2010-109568 A | 5/2010 |
| JP | 2011-124777 A | 6/2011 |

OTHER PUBLICATIONS

Stephen Groat; Matthew Dunlop; Randy Marchany; Joseph Tront, IPV6: Nowhere to Run, Nowhere to Hide, 2011, 44th Hawaii International Conference on System Sciences—2011.*
IPv6 Fingerprinting, Jan. 3, 2012, http://nmap.org/book/osdetect-ipv6-methods.html.*
Frederic Beck, Olivier Festor, Isabelle Chrisment. IPv6 Neighbor Discovery Protocol based OS fingerprinting. [Technical Report] RT-0345, 2007, pp. 27. <inria-00169990v2>.*
International Search Report corresponding to PCT/JP2014/052862, dated Mar. 25, 2014, 2 pages.
Yuji Ukai et, IPv6 Mapping, PacScc 2006 Conference, Nov. 27, 2006,[on line], [Date of Search: Mar. 18, 2014], Internet <URL:http://pacsec.jp/psj06/psj06yukai-j.ppt> (English version : <URL: http://pacsec.jp/psj06/psj06yukai-e.ppt>), 76 pages.
Genba Ito, Actual Operation for Understanding of Mechanism, Let's Try the Basics of IPv6 with Windows, You will Find it When Using it! Guide to IPv6—First Lecture, May 24, 2011 [on line], [Date of Search: Mar. 18, 2014], Internet URL:http://ascii.jp/elem/000/000/605/605659/index-2.html; 4 pages.

* cited by examiner

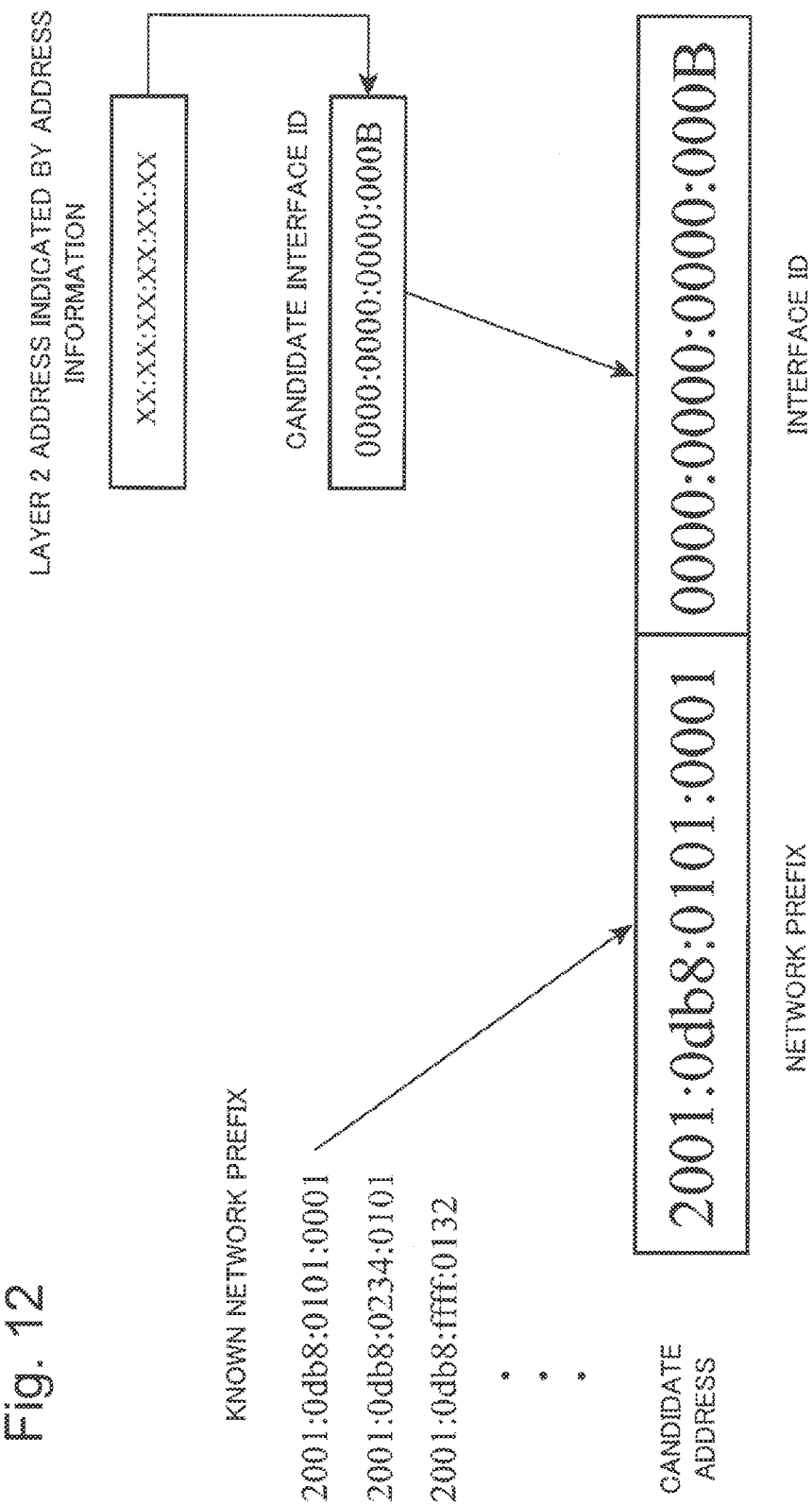

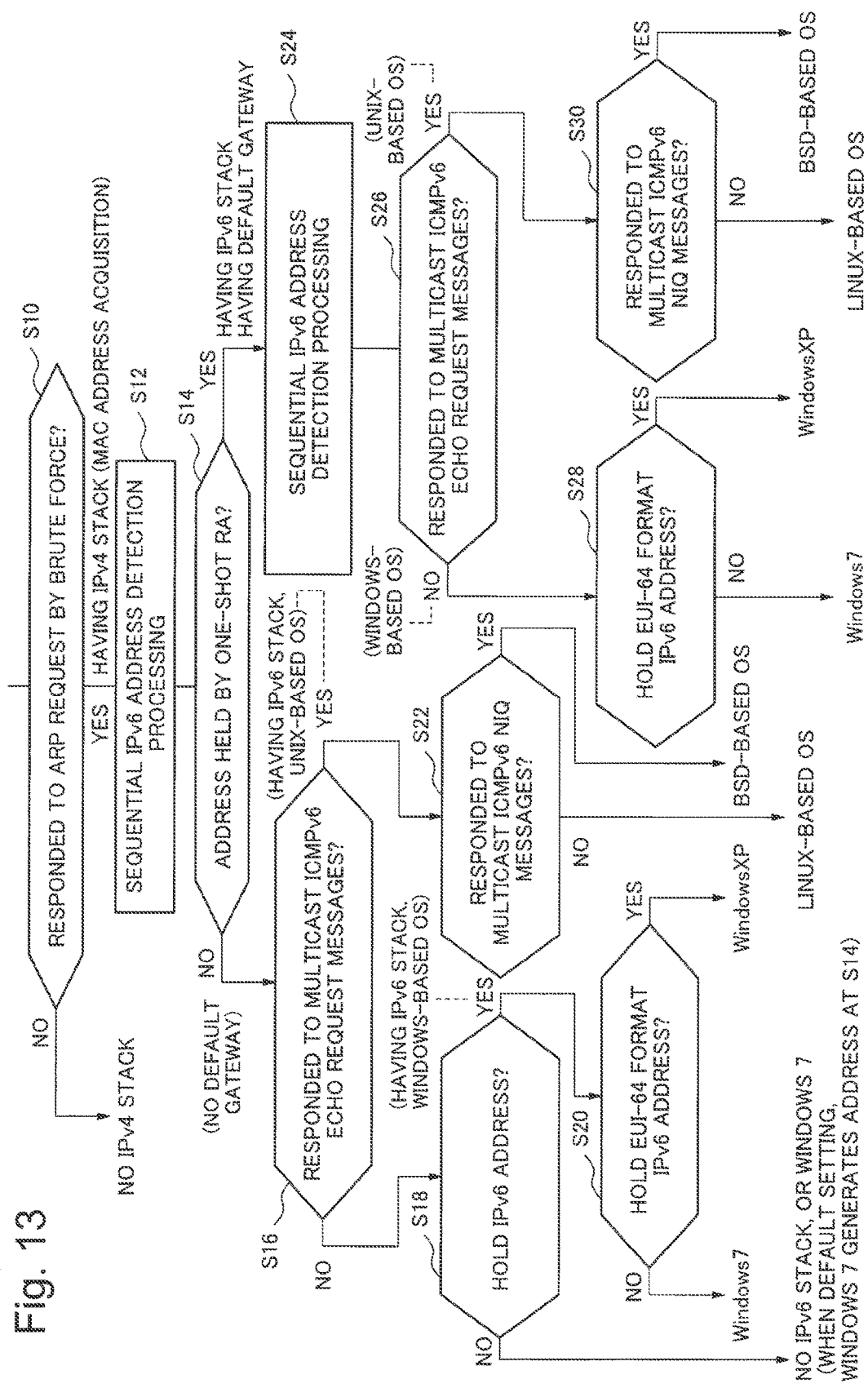

NODE INFORMATION DETECTION APPARATUS, NODE INFORMATION DETECTION METHOD, AND PROGRAM

CROSS-REFERENCE TO RELATED APPLICATIONS

This application is a national stage application of International Application No. PCT/JP2014/052862 entitled "NODE INFORMATION DETECTION APPARATUS, NODE INFORMATION DETECTION METHOD, AND PROGRAM," filed on Feb. 7, 2014, which claims the benefit of the priority of Japanese Patent Application No. 2013-040813, filed on Mar. 1, 2013, the disclosures of each of which are hereby incorporated by reference in their entirety.

TECHNICAL FIELD

The present invention relates to a node information detection apparatus, a node information detection method and a program.

BACKGROUND ART

At present, Internet Protocol Version 6 (IPv6) has been already supported in various computers such as a Personal Computer (PC) and a portable equipment, and IPv6 packets already flow in communication networks. As to global addresses that are newly acquired from now on, only IPv6 addresses may available. Therefore, IPv6 is expected to be adopted more rapidly from now on, in communication networks. According to this, an environment where IPv4 and IPv6 are used together is expected to expand further. Hereinafter, a computer such as a portable equipment or a virtual machine will be denoted also as a node. In addition, a node which supports IPv6 will be denoted as IPv6 node.

With the adoption of the IPv6 in more networks, there is an increasing demand for a method of managing a network that includes an IPv6 node. For example, Patent Literature 1 discloses a technology of detecting unauthorized connection and shutting down a terminal connected in an unauthorized manner in an IPv6 network.

Other technologies for handling IPv6 are disclosed in Patent Literatures 2 to 8 below.

CITATION LIST

Patent Literature

[PTL 1] Japanese Laid-open Patent Publication No. 2006-287299
[PTL 2] Japanese Laid-open Patent Publication No. 2005-333684
[PTL 3] Japanese Laid-open Patent Publication No. 2004-128727
[PTL 4] Japanese Laid-open Patent Publication No. 2009-100363
[PTL 5] Japanese Laid-open Patent Publication No. 2010-063110
[PTL 6] Japanese Laid-open Patent Publication No. 2010-109568
[PTL 7] Japanese Laid-open Patent Publication No. 2011-124777
[PTL 8] Japanese Laid-open Patent Publication No. 2006-319863

SUMMARY OF INVENTION

Technical Problem

For managing a network including IPv6, it is useful to collect information related to the IPv6 node. The inventor of the present invention studied a method of identifying a type of Operating System (OS) operating on an IPv6 node which is connected to a network.

An object of the present invention is to provide a technology with regard to identifying a type of OS operating on a node which supports IPv6.

Solution to Problem

A node information detection apparatus provided by one aspect of the present invention includes a message transmission unit that is configured to transmit, onto a network, a transmission message that is responded to through processing of IPv6 protocol stack, the IPv6 protocol stack being implemented in at least one or more types of Operating Systems (OSs), the processing being executed at a kernel level of the OS; a message reception unit that is configured to receive a response message to the transmission message from a node which received the transmission message; and an OS type identification unit that is configured to identify the type of OS operating on the node on the basis of the contents of the response message transmitted by the node, or on the basis of presence or absence of the response message from the node.

A program provided by one aspect of the present invention is a program which allows a computer to function as a node information detection apparatus. The program allows the computer to execute a processing that each functional component of the node information detection apparatus provided by one aspect of the present invention realizes.

A node information detection method provided by one aspect of the present invention is executed by a computer. The node information detection method includes transmitting, onto a network, a transmission message that is responded to through processing of IPv6 protocol stack that is implemented in at least one or more types of Operating Systems (OSs), the processing being executed at a kernel level of the OS; receiving a response message to the transmission message from a node which received the transmission message; and identifying a type of OS operating on the node on the basis of the contents of the response message transmitted by the node or on the basis of presence or absence of the response message from the node.

Advantageous Effects of Invention

According to each of the above-described aspects, the technology for identifying a type of OS operating on a node that supports IPv6 can be provided.

BRIEF DESCRIPTION OF DRAWINGS

The foregoing objects and other objects, features and advantages will become more apparent from the following description of preferred exemplary embodiments and the accompanying drawings.

FIG. 12 is a diagram conceptually illustrating a third method for generating a candidate address; and FIG. 13 is a flow chart illustrating a flow of operation executed by a node information detection apparatus of an Example.

DESCRIPTION OF EMBODIMENTS

Figure 1:
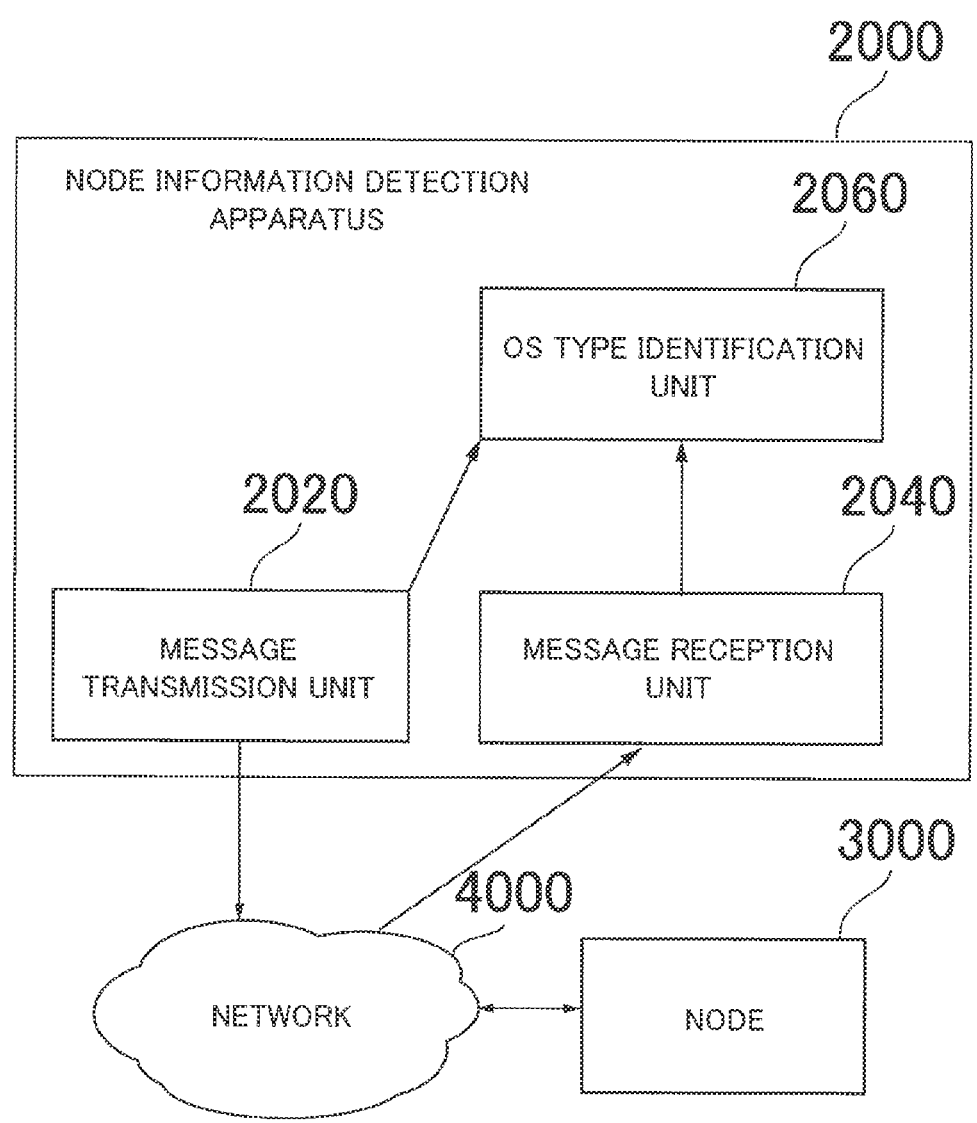
FIG. 1 is a block diagram illustrating a node information detection apparatus according to a First Exemplary Embodiment.

In the following, an exemplary embodiment of the present invention will be described using the drawings. In all the drawings, similar components are identified by the same reference numerals and descriptions thereof are appropriately omitted.

First Exemplary Embodiment

FIG. 1 is a block diagram illustrating a node information detection apparatus 2000 according to an First Exemplary Embodiment. In FIG. 1, an arrow indicates a flow of information. In FIG. 1, each block illustrates not a configuration on a hardware basis but a configuration on a function basis.

<Assumed Environment>

The node information detection apparatus 2000 is connected to a network 4000. The network 4000 may be a network configured with wired communication lines or a network configured with wireless communication lines or a network configured with wired lines and wireless communication lines provided together.

The node information detection apparatus 2000 is communicably connected to a node 3000 via the network 4000. Here, a node represents a computer such as a Personal Computer (PC), a server machine or a portable computer. In addition, the node may be a physical computer or a virtual computer. The virtual computer is, for example, a virtual machine. In the following, the node 3000 connected to the node information detection apparatus 2000 via the network 4000 will be denoted also as "the node 3000 on the network 4000".

The node 3000 supports IPv6. Specifically, the node 3000 has (includes) an IPv6 protocol stack. In the following, a node supporting IPv6 will be denoted as an IPv6 node. Accordingly, the node 3000 is an IPv6 node. A plurality of nodes 3000 may be provided.

The node 3000 having an IPv6 protocol stack is capable of generating and holding an IPv6 address. The phrase "IPv6 node holds an IPv6 address" refers that the IPv6 node is capable of communicating with another node, router, the node information detection apparatus 2000, or the like on the network 4000, by use of the IPv6 address.

The node 3000 includes a network interface to which a layer 2 address is assigned. The node 3000 is connected to the network 4000 via the network interface. In the following, the phrase "the node 3000 holds the layer 2 address" also refers that the node 3000 includes a network interface to which a certain layer 2 address is assigned.

The node 3000 may include a plurality of network interfaces. When the node 3000 includes a plurality of network interfaces, the node 3000 holds the layer 2 address of each network interface. Accordingly, in this case, the node 3000 holds a plurality of layer 2 addresses.

The layer 2 address here is an address handled in a data link layer (layer 2) of an OSI (Open Systems Interconnection) reference model. The layer 2 address is, for example, a MAC address in an Ethernet (registered trademark) protocol.

The network interface included in the node 3000 may be a physical network interface or a virtual network interface. For example, the virtual network interface is a virtual Network Interface Card (NIC) included in the virtual machine.

Under the above-described assumed environment, the node information detection apparatus 2000 identifies the type of OS operating on the node 3000.

<Message Transmission Unit 2020>

The node information detection apparatus 2000 includes a message transmission unit 2020. The message transmission unit 2020 transmits a transmission message. The transmission message is responded through processing of an IPv6 protocol stack, that is executed at a kernel level. The IPv6 protocol stack is implemented in at least one or more types of OSs. When responding to the transmission message, the node 3000 which received the transmission message returns some message to the node information detection apparatus 2000. In the following, this message will be denoted as a response message.

The response message is transmitted through processing of the IPv6 protocol stack, that is executed at a kernel level in the OS, operating on the node 3000. Accordingly, the contents of a response message to be transmitted by the node 3000 does not depend on a user-level application operating on the node 3000. Also, it does not depend on a user-level application operating on the node 3000, whether or not the node 3000 transmits the response message.

For example, the node information detection apparatus 2000 transmits a transmission message with a multicast address as a destination. The multicast address includes, as a communication target, all the IPv6 nodes existing on the same sub-network, to which the node information detection apparatus 2000 connected. In the following, transmission of a transmission message by the node information detection apparatus 2000 with a multicast address, as a destination, targeting all the IPv6 nodes existing on the same sub-network to which the node information detection apparatus 2000 is connected, will be denoted also as "multicasting to all nodes".

Additionally, when identifying an OS operating on a specific node 3000 as a target, the node information detection apparatus 2000 can unicast a transmission message to the node 3000.

<Message Reception Unit 2040>

The node information detection apparatus 2000 includes a message reception unit 2040. The message reception unit 2040 receives a response message from the node 3000 which received the transmission message.

<OS Type Identification Unit 2060>

The node information detection apparatus 2000 includes an OS type identification unit 2060. The OS type identification unit 2060 identifies the type of OS operating on the node 3000 on the basis of the contents of a response message received from the node 3000, or on the basis of presence or absence of a response message from the node 3000.

When identifying the type of OS operating on the node 3000 on the basis of presence or absence of a response message from the node 3000, for example, the OS type identification unit 2060 waits for a predetermined period of time after the message transmission unit 2020 transmits a transmission message. Thereafter, the OS type identification unit 2060 determines whether the message reception unit 2040 receives a response message from the node 3000 or not.

For example, the node information detection apparatus 2000 acquires, in advance, the IPv6 address or the layer 2 address held by the node 3000. The OS type identification unit 2060 extracts the IPv6 address or the layer 2 address of a transmission source (sender) indicated in the response message received by the message reception unit 2040. Then, the OS type identification unit 2060 compares the IPv6 address of the node 3000 acquired in advance with the IPv6 address extracted from the received message. Alternatively, the OS type identification unit 2060 compares the layer 2 address of the node 3000 acquired in advance with the layer 2 address extracted from the received message. Thus, the OS type identification unit 2060 is able to determine presence or absence of a response message from the node 3000.

The reason that a certain IPv6 node fails to transmit a response message, might be that the IPv6 node is in an uncommunicable state. Thus, the node information detection apparatus 2000 may have a function to determine whether each IPv6 node is in a communicable state or not. Currently, for example, the IPv6 node is also often capable of executing communication using IPv4. Thus, for example, the node information detection apparatus 2000 broadcasts an Echo Request message defined in Internet Control Message Protocol (ICMP) of IPv4, to check whether each IPv6 node returns an Echo Reply message or not. The node information detection apparatus 2000 determines that the IPv6 node which returns the Echo Reply message is the IPv6 node which is in a communicable state.

<Hardware Configuration>

Figure 2:
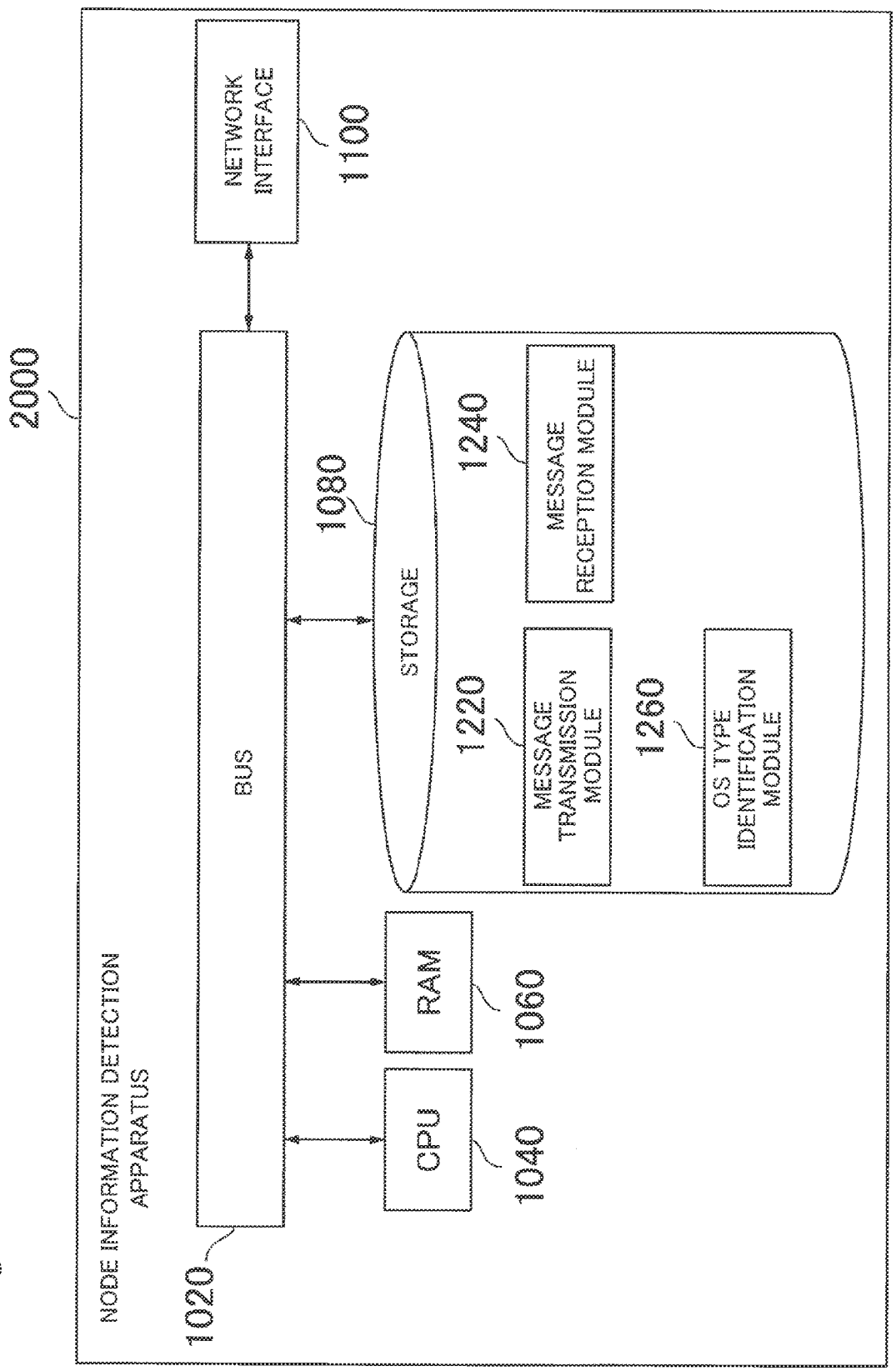
FIG. 2 is a block diagram illustrating a hardware configuration of the node information detection apparatus according to the First Exemplary Embodiment.

FIG. 2 is a block diagram illustrating a hardware configuration of the node information detection apparatus 2000 according to the First Exemplary Embodiment. In FIG. 2, the node information detection apparatus 2000 includes a bus 1020, a Central Processing Unit (CPU) 1040, a Random Access Memory (RAM) 1060, a storage 1080, and a network interface 1100.

The bus 1020 is a transmission line for the CPU 1040, the RAM 1060, the storage 1080 and the network interface 1100 to transmit and receive information each other.

The network interface 1100 is a network interface for communication with the node 3000 via the network 4000.

The network interface 1100 may be a network interface for wireless network connection or a network interface for wired network connection.

A message transmission module 1220 is a program (computer program) for allowing the node information detection apparatus 2000 to function as the message transmission unit 2020. The CPU 1040 realizes the function of the message transmission unit 2020 by executing the message transmission module 1220.

A message reception module 1240 is a program for allowing the node information detection apparatus 2000 to function as the message reception unit 2040. The CPU 1040 realizes the function of the message reception unit 2040 by executing the message reception module 1240.

An OS type identification module 1260 is a program for allowing the node information detection apparatus 2000 to function as the OS type identification unit 2060. The CPU 1040 realizes the function of the OS type identification unit 2060 by executing the OS type identification module 1260.

The message transmission module 1220, the message reception module 1240 and the OS type identification module 1260 are stored, for example, in the storage 1080. Then, each of the above-described modules may be readout to, for example, the RAM 1060 by the CPU 1040. Each of the above-described modules here may be stored in the RAM 1060. When the node information detection apparatus 2000 includes a Read Only Memory (ROM), each of the above-described modules may be stored in the ROM.

The storage 1080 is a storage apparatus such as a hard disk, a USB memory or a Solid State Drive (SSD). Alternatively, the storage 1080 may be a storage apparatus such as a RAM or a ROM.

<Processing Flow of Node Information Detection (1)>

Figure 3:
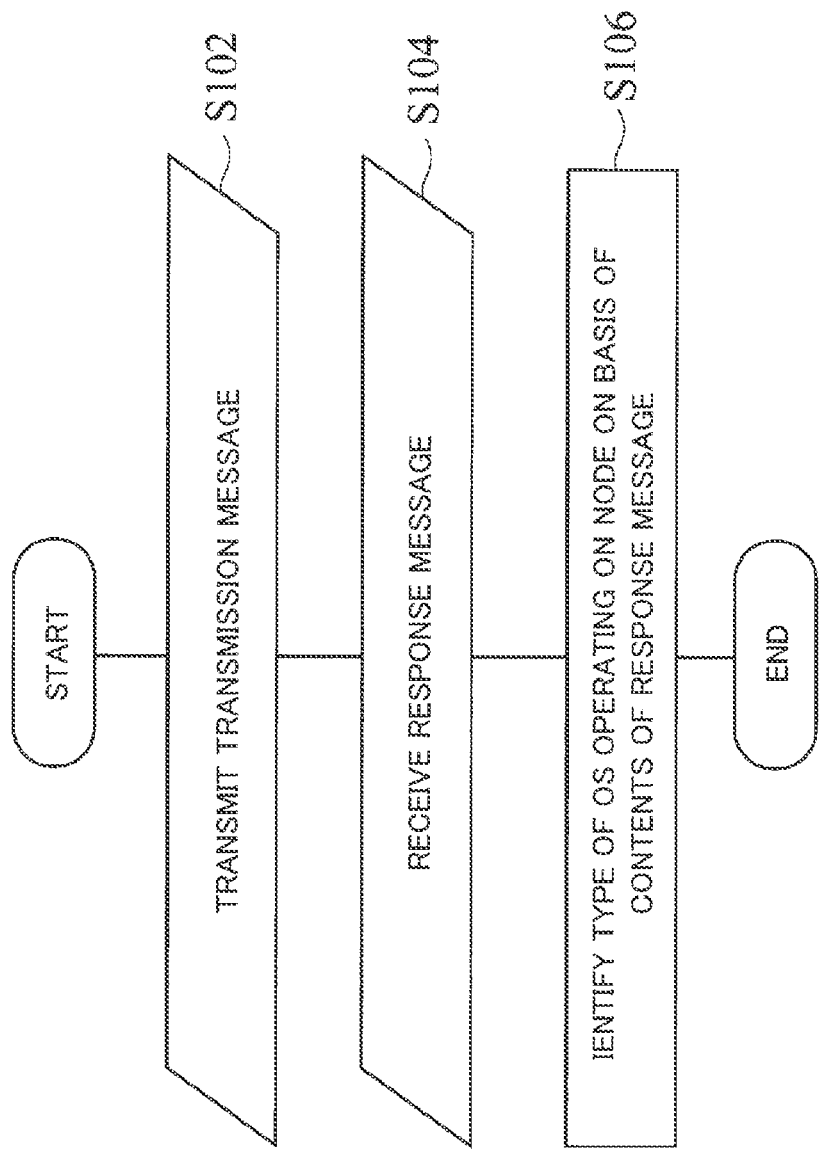
FIG. 3 is a flow chart illustrating one example of node information detection processing by the node information detection apparatus of the First Exemplary Embodiment.

FIG. 3 is a flow chart illustrating one example of processing of node information detection (herein after referred as "node information detection processing") by the node information detection apparatus 2000 of the first First Exemplary Embodiment. The node information detection processing illustrated in FIG. 3 is processing for identifying the type of OS operating on the node 3000, based on the contents of a response message received from the node 3000.

At Step S102, the message transmission unit 2020 transmits the transmission message.

At Step S104, the message reception unit 2040 receives the response message.

At Step S106, the OS type identification unit 2060 identifies the type of OS operating on the node 3000 on the basis of the contents of the response message.

<Processing Flow of Node Information Detection (2)>

Figure 4:
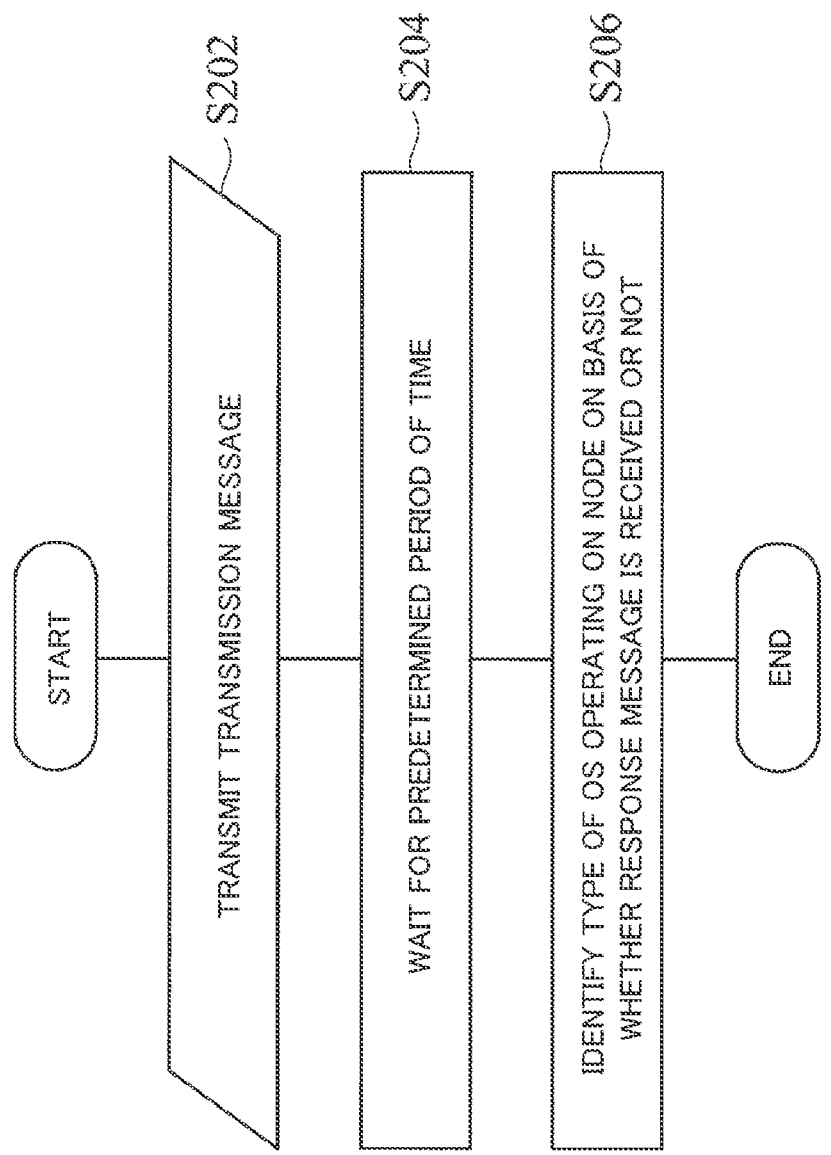
FIG. 4 is a flow chart illustrating one example of the node information detection processing by the node information detection apparatus of the First Exemplary Embodiment.

FIG. 4 is a flow chart illustrating one example of the node information detection processing by the node information detection apparatus 2000 of the First Exemplary Embodiment. The node information detection processing illustrated in FIG. 4 is processing for identifying the type of OS operating on the node 3000 based on presence or absence of the response message from the node 3000.

At Step S202, the message transmission unit 2020 transmits the transmission message.

At Step S204, the OS type identification unit 2060 waits for the predetermined period of time.

At Step S206, the OS type identification unit 2060 determines whether the message reception unit 2040 receives a message from the node 3000 or not. Then, the node information detection apparatus 2000 identifies the type of OS operating on the node 3000 based on the result of determination above.

<Function and Effect>

A function of the IPv6 protocol stack implemented in a kernel included in an OS is different for the type or version of the OS. Thus, the node information detection apparatus 2000 of the First Exemplary Embodiment identifies functions provided by the IPv6 protocol stack of the kernel, which is implemented in the OS operating on the node 3000. Then, the node information detection apparatus 2000 identifies the type of OS operating on the node 3000 according to the result of the identification. Therefore, the node information detection apparatus 2000 is capable of identifying the type of OS operating on the node 3000 without executing an application (hereinafter, denoted as an agent) for identifying the type of OS on the node 3000.

As another method for identifying the type of OS operating on the node 3000, for example, a method using a protocol for network management called Simple Network Management Protocol (SNMP) protocol may be considered. However, in case of using SMNP, it is necessary to execute an agent that can handle SNMP protocol, on a machine for network management and on each of the nodes 3000.

It leads various advantages, that it is not necessary to execute an agent on the node 3000. One of the advantages is that it is unnecessary to rely on a user who uses the node 3000. When identifying the type of OS operating on the node 3000 by using the agent operating on the node 3000, a user of the node 3000 is required to be a reliable user. This is because when the user of the node 3000 is a malicious user, the user might stop operation of an agent or tamper the agent.

On the other hand, the node information detection apparatus 2000 of the First Exemplary Embodiment, identifies the type of OS operating on the node 3000 by using the response message generated through the processing implemented at the kernel level of the OS. Therefore, the node information detection apparatus 2000 is capable of identifying the type of OS operating on the node 3000, even when a malicious user stops or tampers the agent on the node 3000.

Another advantage, that is resulted from that there is no need to operate the agent on the node 3000, is reducing labor required for management of the node 3000. For example, when introducing an agent into the node 3000, labor for installation, maintenance, or management of the agent is required. In some cases, a user inexperienced in PC operation or the like may stop an agent by mistake. To prevent such case, labor is required for monitoring the node 3000 or a user thereof. In case of utilizing the node information detection apparatus 2000, there is no need to introduce the agent into the node 3000. Therefore, none of such various kinds of labors as described above is required. Consequently, it may result in reducing labor required for management of the node 3000.

First Modified Example of Exemplary Embodiment

The OS type identification unit 2060 of the First Exemplary Embodiment may have the following features. The node information detection apparatus 2000 of the First Exemplary Embodiment including the OS type identification unit 2060 which provides the following features will be denoted as the node information detection apparatus 2000 of a First Modified Example.

The OS type identification unit 2060 of the First Modified Example identifies the type of OS operating on the node 3000 on the basis of the contents of a message received from the node 3000.

For example, the OS type identification unit 2060 of the First Modified Example identifies the type of OS operating on the node 3000 on the basis of a value of an interface ID, of an IPv6 address held by the node 3000, which is included in a message received from the node 3000.

Figure 5:
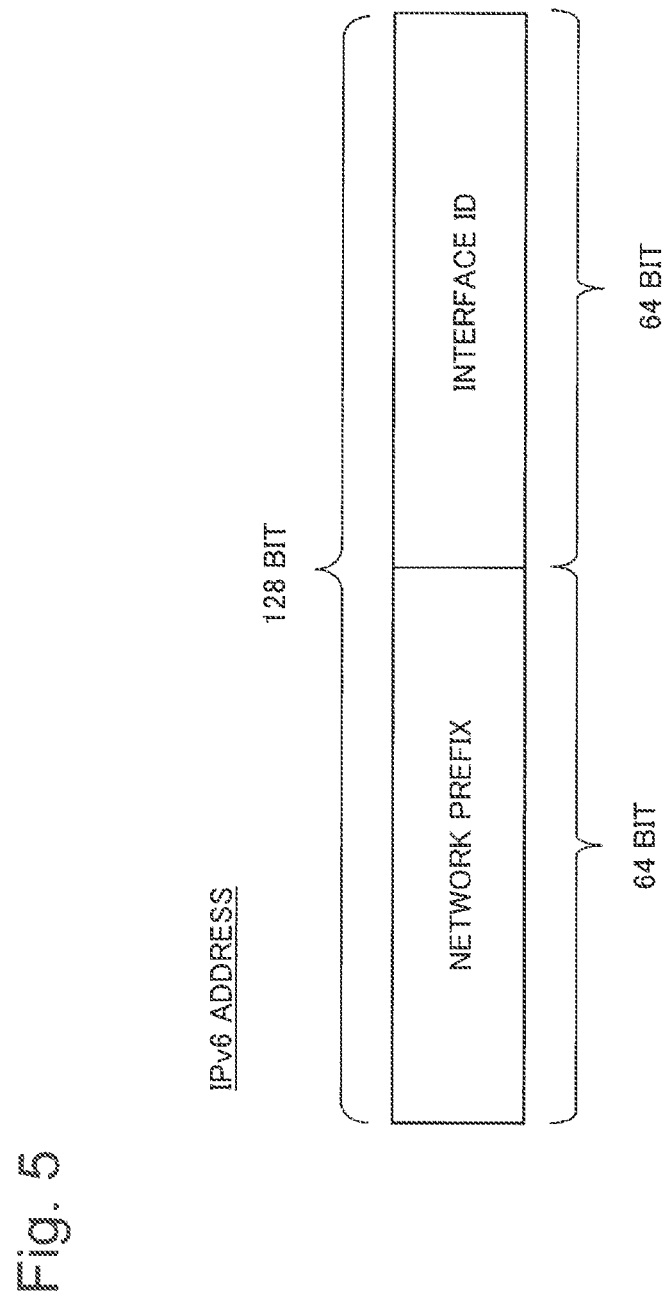
FIG. 5 is a diagram illustrating one example of an IPv6 address configuration.

The IPv6 address includes a network prefix and an interface ID as illustrated in FIG. 5. The network prefix is an identifier of the sub-network at the network layer (layer 3) level of the Open Systems Interconnection (OSI) reference model. Each node having the IPv6 address with a common network prefix belongs to the same sub-network at the layer 3 level. The interface ID is an identifier which identifies a plurality of IPv6 nodes belonging to the same sub-network.

There exists a certain OS which generates the interface ID of an IPv6 address held by an IPv6 node on the basis of a MAC address held by the IPv6 node. For example, Windows (registered trademark) XP and Windows (registered trademark)-based OSes of which version is earlier than that of Windows (registered trademark) XP, may be included in such kind of OSs. The MAC address is a layer 2 address used in an Ethernet (registered trademark) protocol.

A method of generating the interface ID on the basis of the MAC address may use, for example, a value obtained by converting the MAC address into an EUI-64 (registered trademark) format value. Since this method is a known method, detailed description thereof is omitted. In the following, the IPv6 address whose interface ID is the value obtained by converting the a MAC address of the node to the EUI-64 (registered trademark) format will be denoted as the EUI-64 (registered trademark) format IPv6 address.

For example, it is assumed that the type of OS operating on the node 3000 is found to be a Windows (registered trademark)-based OS. In this case, the OS type identification unit 2060 determines whether the IPv6 address held by the node 3000 is generated on the basis of the MAC address held by the node 3000 or not.

Assuming a case that the OS type identification unit 2060 determines that the IPv6 address held by the node 3000 is generated on the basis of the MAC address held by the node 3000. In this case, the OS type identification unit 2060 identifies that the OS operating on the node 3000 is the Windows (registered trademark) XP, or the Windows (registered trademark)-based OS of which version is earlier than that of the Windows (registered trademark) XP.

On the other hand, it is assumed that the OS type identification unit 2060 determines that the IPv6 address held by the node 3000 is not generated on the basis of the MAC address held by the node 3000. In this case, the OS type identification unit 2060 identifies that the OS operating on the node 3000 is the Windows (registered trademark)-based OS of which version is later than that of the Windows (registered trademark) XP.

<Function and Effect>

There exists an OS which generates the IPv6 address of the node on the basis of the layer 2 address of the node. On the other hand, there exists an OS which generates the IPv6 address of the node without regard to layer 2 address of the node. With the node information detection apparatus 2000 of the First Modified Example, it is possible to identify whether the OS operating on the node 3000 is an OS which generates the IPv6 address of the node 3000 on the basis of the layer 2 address of the node 3000, or not.

Second Modified Example of Exemplary Embodiment

The OS type identification unit 2060 of the First Exemplary Embodiment may have the following features. The node information detection apparatus 2000 of the First Exemplary Embodiment including the OS type identification unit 2060 which provides the following features will be denoted as the node information detection apparatus 2000 of a Second Modified Example.

The OS type identification unit 2060 of the Second Modified Example uses, as the transmission message, at least one or more of an Echo Request message or a Node Information Query (NIQ) message of ICMP Version 6 (ICMPv6). In the following, detailed description will be made of a method using the Echo Request message of ICMPv6 and the NIQ message of ICMPv6, respectively.

<Echo Request Message>

There exists an OS that returns an ICMPv6 Echo Reply message to an IPv6 node which transmitted ICMPv6 Echo Request message, in case receiving the Echo Request message. Processing of returning the ICMPv6 Echo Reply message is executed through the processing of IPv6 protocol stack being implemented in the OS. The processing of IPv6 protocol stack is executed at a kernel level of the OS For example, a Unix (registered trademark)-based OS including a BSD (registered trademark)-based OS or a Linux (registered trademark)-based OS may provide a function of returning the ICMPv6 Echo Reply message. The BSD-based OS here include the iOS (registered trademark) as well. On the other hand, a Windows (registered trademark)-based OS does not provide this function.

Thus, for example, the node information detection apparatus 2000 multicasts ICMPv6 Echo Request messages to all the nodes. At this time, it is assumed that the OS operating on an IPv6 node, that receives the above-described Echo Request message, is known to be a Windows (registered trademark)-based OS or a Unix (registered trademark)-based OS is in operation, in advance. In this case, the node information detection apparatus 2000 determines that the Unix (registered trademark)-based OS is in operation on the IPv6 node which have sent the ICMPv6 Echo Reply message as response. On the other hand, the node information detection apparatus 2000 determines that the Windows (registered trademark)-based OS is in operation the IPv6 node which have not replied the ICMPv6 Echo Reply message.

<NIQ Message>

An NIQ message of ICMPv6 is a message for inquiring for information about the IPv6 node. There exists an OS which transmits a response message to the IPv6 node which transmitted the ICMPv6 NIQ message, in case receiving that NIQ message. The processing of responding to the ICMPv6 NIQ message is executed by an IPv6 protocol stack that is executed at a kernel level implemented in the OS. For example, a BSD (registered trademark)-based OS provides a function of transmitting a response message to the ICMPv6 NIQ message. On the other hand, a Linux (registered trademark)-based OS does not provide this function.

Thus, for example, the node information detection apparatus 2000 multicasts ICMPv6 NIQ messages to all the nodes. At this time, it is assumed that the OS operating on each IPv6 node, which receives the above-described NIQ message, is known, in advance, to be the BSD (registered trademark)-based OS or the Linux (registered trademark)-based OS. In this case, the node information detection apparatus 2000 determines that the BSD (registered trademark)-based OS is in operation on the IPv6 node which transmitted the response message to the above-described NIQ message. On the other hand, the node information detection apparatus 2000 determines that the Linux (registered trademark)-based OS is in operation on the IPv6 node which fails to return the response message.

<Function and Effect>

The node information detection apparatus 2000 uses an Echo Request or an NIQ message of ICMPv6 in a different way from original purpose. Typically, the ICMPv6 Echo Request message is used to examine whether the IPv6 node, which is target of communication, is in a communicable state or not. In contrast, the node information detection apparatus 2000 identifies the type of OS operating on each IPv6 node on the basis of whether the ICMPv6 Echo Reply message is returned or not.

Also, typically, the ICMPv6 NIQ message is used to acquire a message which indicates information of the IPv6 node, from the IPv6 node. In contrast, the node information detection apparatus 2000 identifies the type of OS operating on each IPv6 node on the basis of whether the ICMPv6 NIQ message is responded to or not.

Thus, the node information detection apparatus 2000 identifies an OS on the node 3000 by using a message already defined by a protocol. Accordingly, the node information detection apparatus 2000 has an advantage of easy implementation.

Another advantage of the node information detection apparatus 2000 of the Second Modified Example is that the node information detection apparatus 2000 may prevent that management of the network 4000 becomes complicated. This is because the node information detection apparatus 2000 of the Second Modified Example identifies an OS on the node 3000 by using a message defined by the formal protocol of ICMPv6.

For example, some packets flowing on the network 4000 may be monitored for the purpose of improving security or the like. In the following, an apparatus which executes this monitoring will be denoted as a packet monitoring apparatus. In such a case, the packet monitoring apparatus may recognize a certain packet, including a message not defined by any formal protocol, as a dangerous packet. In such a case, the packet monitoring apparatus recognizes the node information detection apparatus 2000 as an apparatus which executes dangerous operation. As a result, a problem such that the communication with the node information detection apparatus 2000 would be shut-down, may occur. In order to prevent this situation, complicated management such as changing settings of the packet monitoring apparatus, is required.

Since the node information detection apparatus 2000 uses a message defined in the formal protocol of ICMPv6, such a problem as described above does not occurs. This prevents management of the network 4000 from becoming complicated.

Specific Example of Exemplary Embodiment

In the following, one Specific example of operation of the node information detection apparatus 2000 will be described using an Specific Example. The node information detection apparatus 2000 of the present Specific Example has each function described in the First Exemplary Embodiment, the First Modified Example and the Second Modified Example.

<Assumptions>

The following assumptions are assumed in the present Specific Example. First, a node operates any of Windows (registered trademark)-based OSes and Unix (registered trademark)-based OSes. The Windows (registered trademark)-based OS is the Windows (registered trademark) XP or the Windows (registered trademark) 7. The Unix (registered trademark)-based OS is the BSD (registered trademark)-based OS or the Linux (registered trademark)-based OS. The BSD (registered trademark)-based OS includes the iOS (registered trademark).

Some nodes have the IPv4 protocol stack and others don't. In the following, a node having the IPv4 protocol stack will be denoted as an IPv4 node. In addition, some nodes are IPv6 nodes and others are not IPv6 nodes. A node having both the IPv4 protocol stack and an IPv6 protocol stack is the IPv4 node, and is the IPv6 node as well.

The node holds a MAC address as a layer 2 address.

Under the foregoing assumptions, the node information detection apparatus 2000 identifies the type of OS operating on the node. In the following description, the node information detection apparatus 2000 collects information about the node in addition to information about the OS operating on the node. Specifically, the node information detection apparatus 2000 acquires the IPv4 address, the IPv6 address and the MAC address held by the node. Further, the node information detection apparatus 2000 associates each of the above-described addresses held by the node. Thus, the node information detection apparatus 2000 of the present Specific Example collects information about the node on a network where IPv4 and IPv6 are used together.

In the present Specific Example, the node information detection apparatus 2000 executes One-shot RA processing and sequential IPv6 address detection processing. Prior to detailed description of the present Specific Example, these processing will be explained.

<One-Shot RA Processing>

The One-shot RA processing is processing for detecting an IPv6 address held by a node by using a Router Advertisement (RA) message defined by IPv6. Originally, the RA message is a message by a router which executes IPv6 routing (hereinafter, IPv6 router) to notify a network prefix of sub-network, which the router manages, to each node. By using characteristics of operation by the IPv6 node which received the RA message, the One-shot RA processing detects the IPv6 address held by the IPv6 node.

First, the node information detection apparatus 2000 broadcasts the RA message at the layer 2 level. By doing this, the node information detection apparatus 2000 induces transmission of a Neighbor Solicitation (NS) message by the IPv6 node. Then, the node information detection apparatus 2000 extracts the layer 2 address indicated by the NS message received from the IPv6 node. As a result, the node information detection apparatus 2000 is possible to detect the layer 2 address of the IPv6 node existing on the network 4000. The node information detection apparatus 2000 is also possible to understand which node existing on the network 4000 has the IPv6 protocol stack.

The node information detection apparatus 2000 induces transmission of the NS message by the IPv6 node by broadcasting the RA message at the layer 2 level. In the following, the principle of the processing will be described. The NS message is a message defined in IPv6.

The IPv6 node has a function of automatically generating an IPv6 address including a network prefix indicated by an received RA message, when receiving the RA message. This function is called a Stateless Address Autoconfiguration (SLAAC) function. Meanwhile, an IPv6 node, which does not set the default gateway, does not generate a new IPv6 address even when receiving the RA message.

Further, after generating a new IPv6 address and before holding the IPv6 address, the IPv6 node executes processing of confirming that the generated IPv6 address is not held by another node. The processing is called Duplicate Address Detection (DAD) processing. Executing the DAD processing prevents the IPv6 node from holding the same IPv6 address as that of other IPv6 nodes.

Specifically, the DAD processing is such processing as described in the following. First, an IPv6 node which executes the DAD processing broadcasts the NS message which indicates a newly generated IPv6 address at the layer 2 level. The NS message is a message defined in IPv6. The IPv6 node stores the IPv6 address in the above-described NS message as a target address.

The IPv6 node which received the NS message confirms whether the IPv6 address indicated by the NS message is the same as the IPv6 address held by the IPv6 node itself. When the IPv6 address held by the IPv6 node which received the NS message is the same as the IPv6 address indicated by the NS message, the IPv6 node transmits a Neighbor Advertisement (NA) message to the IPv6 node which transmitted the NS message. The NA message is defined in IPv6.

In case receiving the NA message from other IPv6 nodes, the IPv6 node which executes the DAD processing determines that a generated IPv6 address is held by another IPv6 node. As a result, the IPv6 node executing the DAD processing does not hold the generated IPv6 address.

On the other hand, for example, when the IPv6 node executing the DAD processing does not received the NA message from other IPv6 nodes, even after a predetermined time from transmitting an NS message has lapsed, the IPv6 node determines that the generated IPv6 address is not held by another IPv6 node. As a result, the IPv6 node executing the DAD processing holds the generated IPv6 address.

Figure 6:
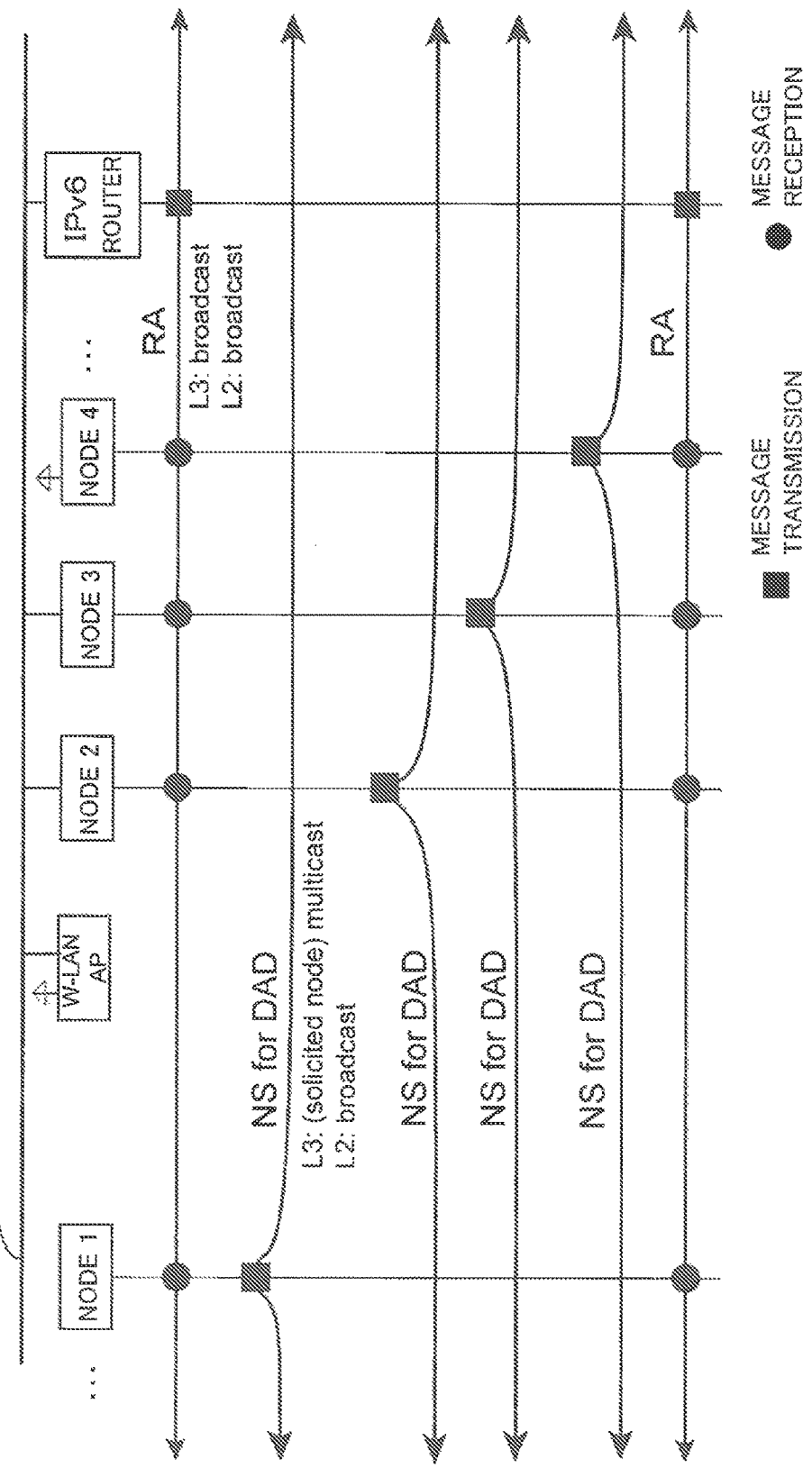
FIG. 6 is a diagram conceptually illustrating a state in which IPv6 router transmits an RA (Router Advertisement) message.

FIG. 6 is a diagram conceptually illustrating transmission of the RA message by the IPv6 router. In FIG. 6, the IPv6 router broadcasts the RA message at the layer 2 level. Node 1 to node 4 receive the RA message. Then, each of the node 1 to the node 4 broadcasts an NS message at the layer 2 level for the DAD processing.

Figure 7:
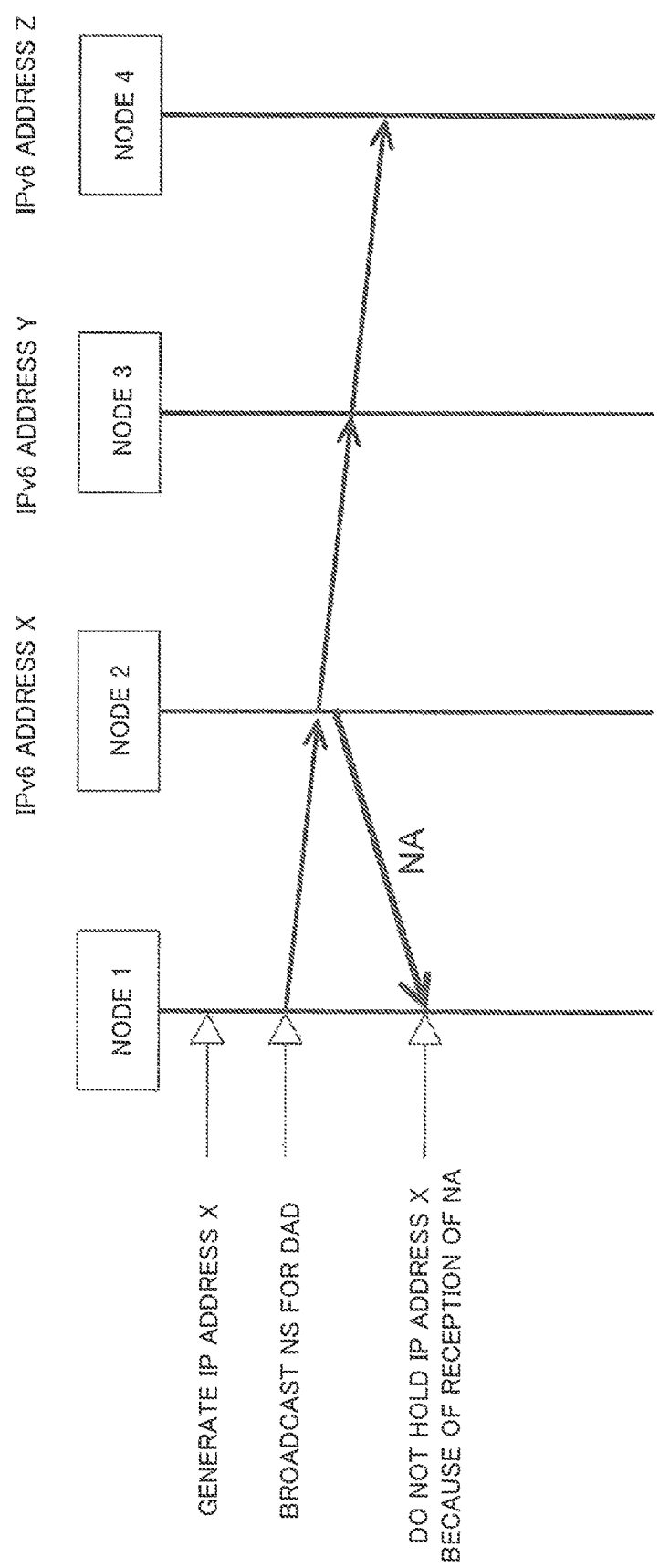
FIG. 7 is a diagram illustrating DAD (Duplicate Address Detection) processing to be executed when an IPv6 address generated by certain IPv6 node is held by another IPv6 node.
Figure 8:
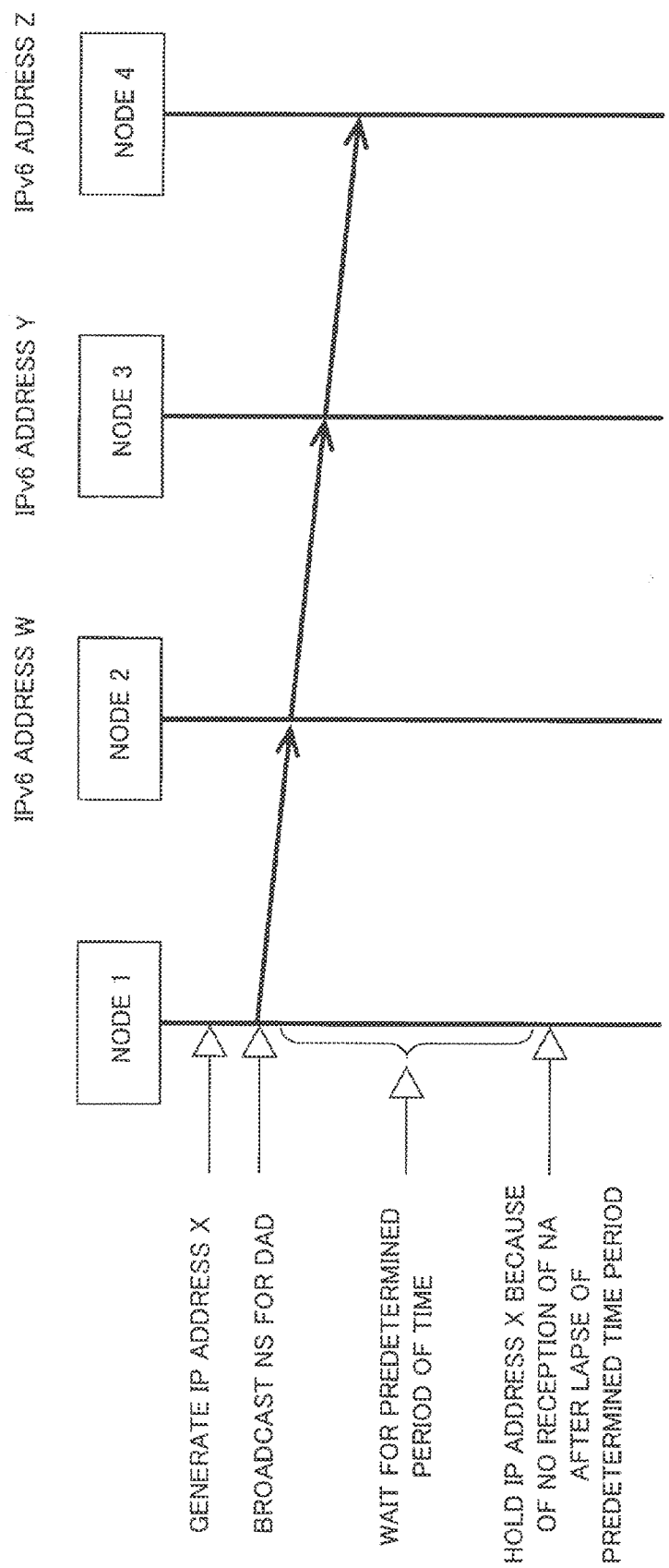
FIG. 8 is a diagram illustrating DAD processing to be executed when an IPv6 address generated by certain IPv6 node is not held by another IPv6 node.

FIG. 7 and FIG. 8 are diagrams conceptually illustrating the DAD processing that may be executed by the IPv6 node. FIG. 7 illustrates the DAD processing to be executed when the IPv6 address generated by a certain IPv6 node is held by another IPv6 node. The node 1 generates the IPv6 address X as a new IPv6 address. Then, the node 1 executes the DAD processing to confirm that the generated IPv6 address X is not held by another IPv6 node. Specifically, the node 1 broadcasts the NS message in which the IPv6 address X is stored as a target address at the layer 2 level.

Each of the node 2 to the node 4 which connected to the same network as that of the node 1 receives an NS message transmitted by the node 1. Here, assuming that the node 2 is a node which holds the IPv6 address X, before the node 1 executes the DAD processing. In this case, after receiving the NS message from the node 1, the node 2 transmits the NA message to the node 1.

The node 1 receives the NA message from the node 2. Thus, the node 1 determines that the generated IPv6 address X is held by another node. As a result, the node 1 decides not to hold the IPv6 address X.

On the other hand, FIG. 8 illustrates the DAD processing to be executed when an IPv6 address generated by a certain IPv6 node is not held by another IPv6 node. Similar to FIG. 7, after generating the IPv6 address X, the node 1 broadcasts the NS message in which the IPv6 address X stored as a target address at the layer 2 level.

In a case of FIG. 8, none of the node 2 to the node 4 holds the IP address X. Therefore, the node 1 does not receive NA message even after a predetermined time has lapsed. Thus, the node 1 determines that the IPv6 address X is not held by another node. As a result, the node 1 decides to hold the IPv6 address X.

As described above, when receiving an RA message, the IPv6 node generates a new IPv6 address including a network prefix indicated by the RA message by the SLAAC function. Further, the IPv6 node executes the DAD processing including transmission of the NS message to confirm that the generated IPv6 address is not held by another IPv6 node.

Figure 9:
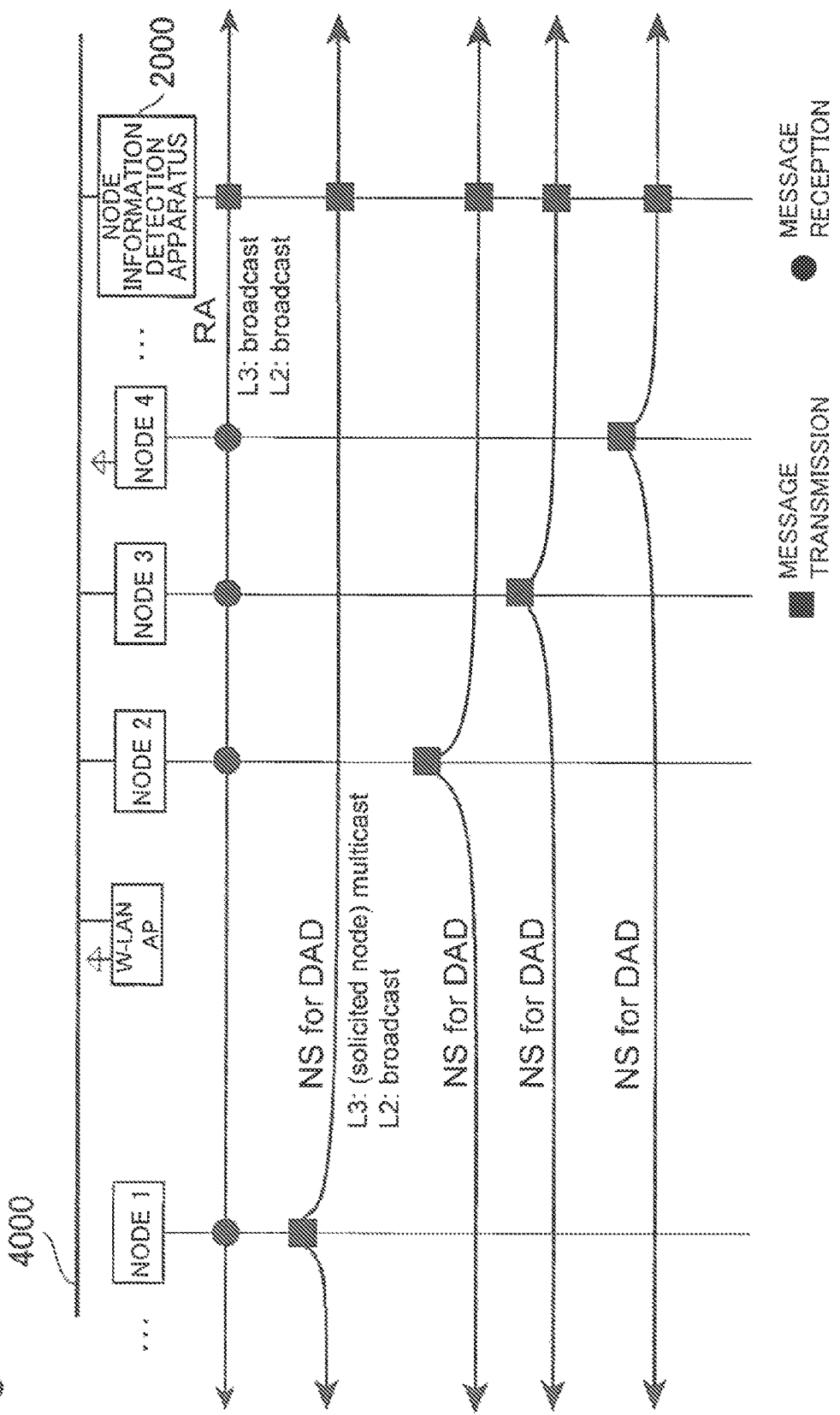
FIG. 9 is a diagram conceptually illustrating a state in which the node information detection apparatus transmits an RA message.

FIG. 9 is a diagram conceptually illustrating how the node information detection apparatus 2000 transmits the RA message. In FIG. 9, the node information detection apparatus 2000 broadcasts the RA message at the layer 2 level. Each of the node 1 to the node 4 which received the RA message broadcasts an NS message for the DAD processing at the layer 2 level. The node information detection apparatus 2000 receives these NS messages. Thus, when a node is the IPv6 node and is a node which sets a default gateway, after generating a new IPv6 address, the node transmits the NS message indicating the IPv6 address. The node information detection apparatus 2000 receives the NS message and extracts the IPv6 address indicated by the NS message, thereby detecting the IPv6 address of the node. In this case, the node information detection apparatus 2000 also is able to find that the node is a node which sets the default gateway.

On the other hand, even when the RA message is broadcast, if the node does not transmit an NS message, the node information detection apparatus 2000 finds that the node is not the IPv6 node or is a node which set the default gateway.

<Sequential IPv6 Address Detection Processing>

The sequential IPv6 address detection processing is processing for detecting an unknown IPv6 address held by a node by using a known IPv6 address held by the node or a known layer 2 address held by the node. Specifically, the unknown IPv6 address held by a node is detected by any of the following methods.

First, the node information detection apparatus 2000 acquires address information which indicates at least one or more of an IPv6 address or a layer 2 address held by the node. Next, the node information detection apparatus 2000 generates a candidate address which is an IPv6 address not indicted by the address information of the node and is an IPv6 address supposed to be held by the node on the basis of above-described address information. Then, the node information detection apparatus 2000 confirms whether the candidate address is held by the above-described node or not. When the candidate address is held by the above-described node, the node information detection apparatus 2000 is considered to have detected that the IPv6 address generated as the candidate address is one of the unknown IPv6 addresses held by the nodes.

The node information detection apparatus 2000 generates the candidate address by any of the following three methods. A first method for generating the candidate address is a method of generating the candidate address by using a known network prefix and an interface ID of an IPv6 address indicated by address information. Specifically, the node information detection apparatus 2000 uses the known network prefix as the network prefix of the candidate address. The node information detection apparatus 2000 also uses the interface ID of the IPv6 address indicated by the address information as the interface ID of the candidate address.

For example, the node information detection apparatus 2000 acquires the known network prefix as prefix information. There is various methods for acquiring the network prefix. For example, in case of receiving a notification of a network prefix from an IPv6 router, the node information detection apparatus 2000 may acquire the network prefix. Then, the node information detection apparatus 2000 stores the prefix information indicating the acquired network prefix.

For example, the node information detection apparatus 2000 may use a Router Solicitation (RS) message defined in IPv6, to acquire, from each router, the network prefix of a sub-network managed by each router. Since the method for acquiring the network prefix managed by each router by using an RS message is a known, detailed description about this method will be omitted.

Figure 10:
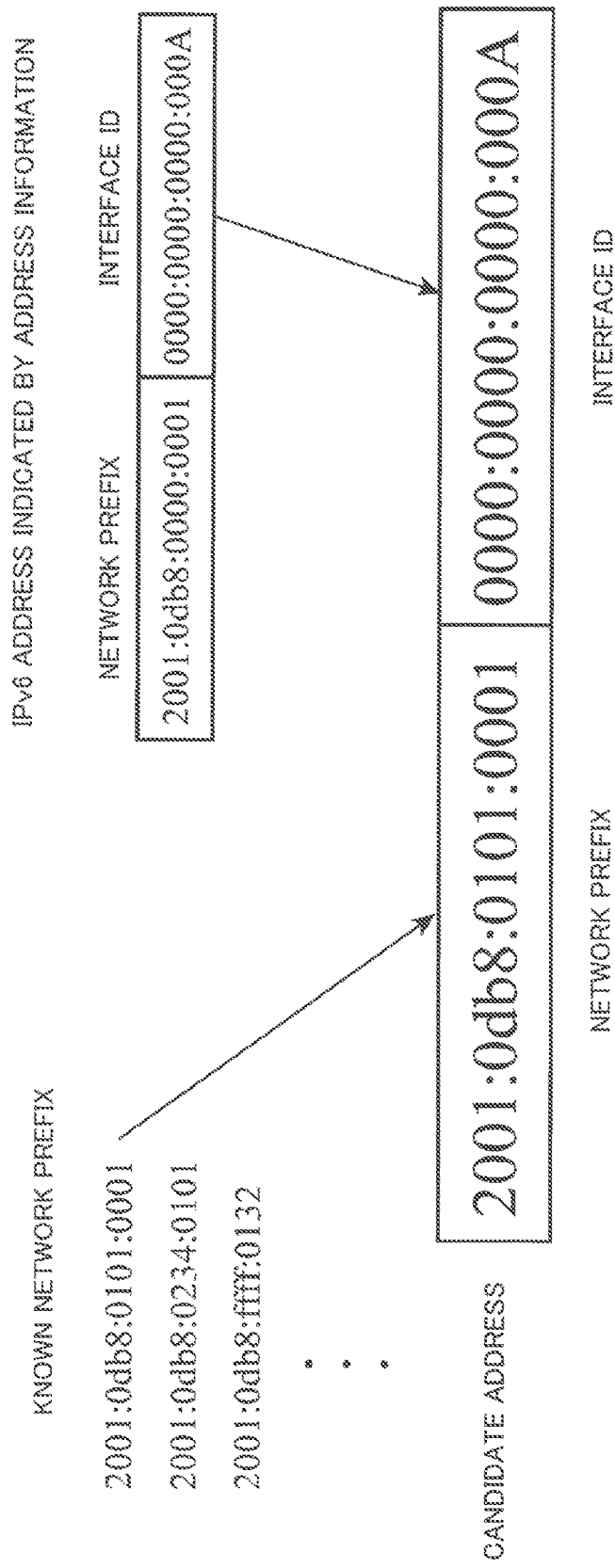
FIG. 10 is a diagram conceptually illustrating a first method for generating a candidate address.

FIG. 10 is a diagram conceptually illustrating the first method for generating the candidate address. In an example of FIG. 10, the prefix information indicates three network prefixes, "2001:0db8:0101:0001", "2001:0db8:0234:0101", and "2001:0db8:ffff:0132". The address information indicates an IPv6 address, "2001:0db8:0000:0001:0000:0000: 0000:000A".

Thus, the node information detection apparatus 2000 uses "2001:0db8:0101:0001", which is one of network prefixes indicated by the prefix information, as the network prefix of the candidate address. Then, the node information detection apparatus 2000 uses "0000:0000:0000:000A", which is the interface ID of the IPv6 address indicated by the address information, as the interface ID of the candidate address. As a result, the node information detection apparatus 2000 generates the IPv6 address, "2001:0db8:0101:0001:0000: 0000:0000:000A" as the candidate address.

The second method for generating the candidate address is a method of generating the candidate address by using a network prefix of an IPv6 address indicated by address information and a candidate interface ID. The candidate interface ID is a value calculated by the node information detection apparatus 2000 by converting a layer 2 address which is indicated by the address information by a certain method.

As the network prefix of the candidate address, the node information detection apparatus 2000 uses the network prefix of an IPv6 address indicated by the address information. Further, the node information detection apparatus 2000 uses the candidate interface ID as the interface ID of the candidate address.

As described with regard to the node information detection apparatus 2000 of the First Modified Example, an EUI-64 (registered trademark) format IPv6 address can be used as the IPv6 address to be assigned to the node. An interface ID of the EUI-64 (registered trademark) format IPv6 address is defined by using a value obtained by converting a MAC address of the node into the EUI-64 (registered trademark) format value. Accordingly, the above-described given method for calculating the candidate interface ID by the node information detection apparatus 2000 of the present Specific Example may be a method that converts the MAC address of the node into the EUI-64 (registered trademark) format value and utilizes the obtained value.

Figure 11:
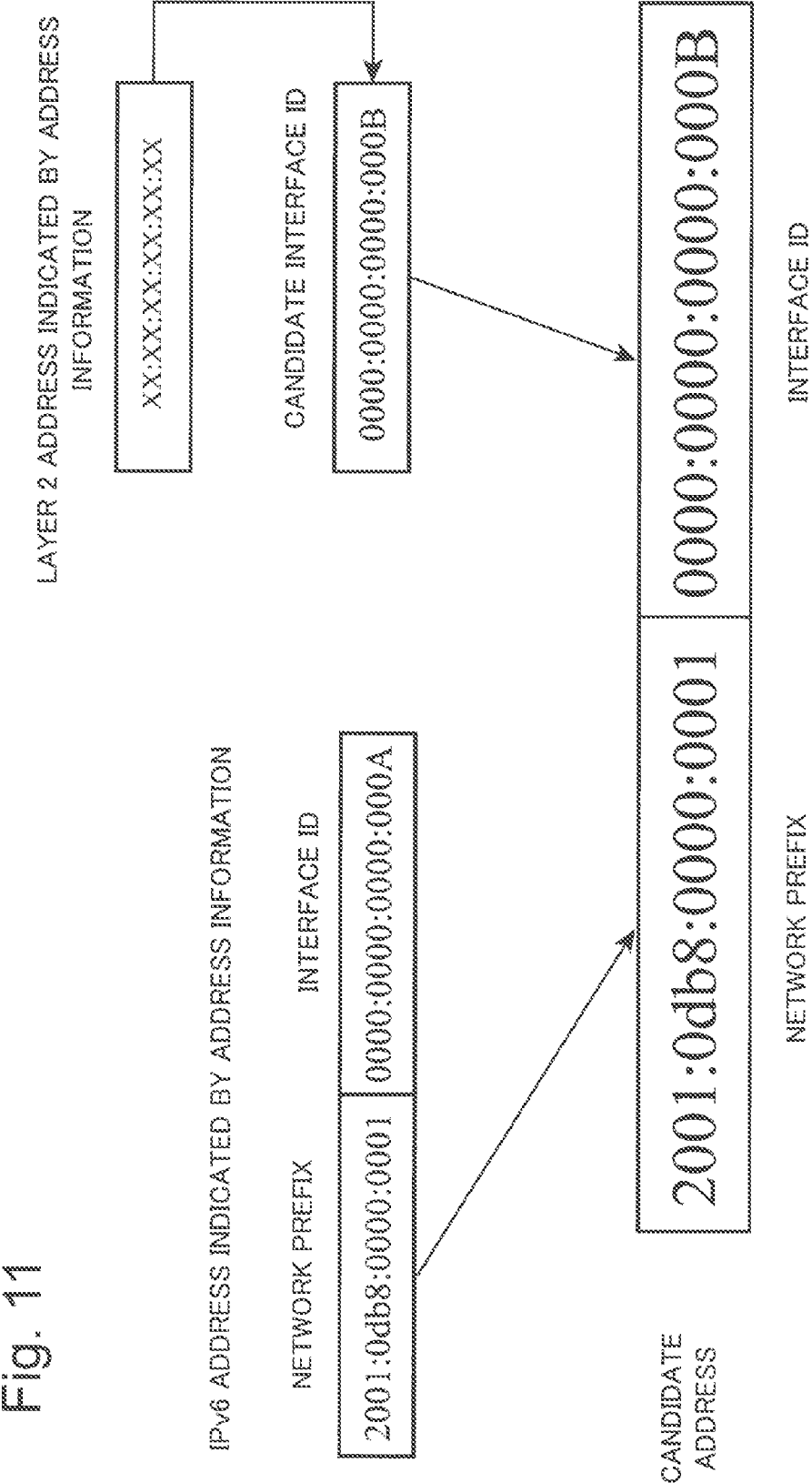
FIG. 11 is a diagram conceptually illustrating a second method for generating a candidate address.

FIG. 11 is a diagram conceptually illustrating the second method for generating a candidate address. In an example of FIG. 11, the address information indicates an IPv6 address, "2001:0db8:0000:0001:0000:0000:0000:000A". Further, the address information indicates a layer 2 address, "XX:XX:XX:XX:XX:XX". Then, the node information detection apparatus 2000 converts the layer 2 address indicated by the address information by a certain method to generate the candidate interface ID, "0000:0000:0000:000B".

Thus, as the network prefix of the candidate address, the node information detection apparatus 2000 uses "2001:

0db8:0000:0001", which is the network prefix of the IPv6 address indicated by the address information. As the interface ID of the candidate address, the node information detection apparatus 2000 also uses "0000:0000:0000:000B" as the candidate interface ID. As a result, the node information detection apparatus 2000 generates the IPv6 address, "2001:0db8:0000:0001:0000:0000:0000:000B", as the candidate address.

The third method for generating the candidate address is a method of generating the candidate address by using a known network prefix and a candidate interface ID. Specifically, the node information detection apparatus 2000 uses the network prefix indicated by prefix information as the network prefix of the candidate address. Further, the node information detection apparatus 2000 uses the candidate interface ID as the interface ID of the candidate address.

FIG. 12 is a diagram conceptually illustrating the third method for generating the candidate address. In an example of FIG. 12 here, the prefix information indicates three network prefixes, "2001:0db8:0101:0001", "2001:0db8:0234:0101" and "2001:0db8:ffff:0132". The address information also indicates the layer 2 address, "XX:XX:XX:XX:XX:XX". Then, the node information detection apparatus 2000 converts the layer 2 address indicated by the address information by a certain method to generate the candidate interface ID, "0000:0000:0000:000B".

Thus, as the network prefix of the candidate address, the node information detection apparatus 2000 uses "2001:0db8:0101:0001", which is one of network prefixes indicated by the prefix information. As the interface ID of the candidate address, the node information detection apparatus 2000 uses "0000:0000:0000:000B", which is the candidate interface ID. As a result, the node information detection apparatus 2000 generates the IPv6 address, "2001:0db8:0101:0001:0000:0000:0000:000B" as the candidate address.

Details of Specific Example

In the following, details of operation executed by the node information detection apparatus 2000 of the present Specific Example will be described using a flow chart. FIG. 13 is a flow chart illustrating operation of the node information detection apparatus 2000 of the present Specific Example. In the following, operation of the node information detection apparatus 2000 in the present Specific Example will be described by referring to FIG. 13.

First, at Step S10, the node information detection apparatus 2000 broadcasts an Address Resolution Protocol (ARP) request of IPv4 by brute force. By transmitting an ARP request which indicates the IPv4 address, a response message including the MAC address held by the IPv4 node can be obtained from the IPv4 node. Therefore, the node information detection apparatus 2000 broadcasts the ARP request by varying its IPv4 address, to acquire the response message to the ARP request. This enables the node information detection apparatus 2000 to acquire combinations of "an IPv4 address and a MAC address".

The node information detection apparatus 2000 determines that the node, which does not respond to the brute force ARP request, is a node having no IPv4 protocol stack.

At Step S12, the node information detection apparatus 2000 executes the sequential IPv6 address detection processing by using the MAC address of the node acquired at Step S10. The node information detection apparatus 2000 generates the candidate address by using the above-described third method for generating the candidate address, thereby executing the sequential IPv6 address detection processing. Thus, the node information detection apparatus 2000 acquires the EUI-64 (registered trademark) format IPv6 address held by the node. The node information detection apparatus 2000 also associates each of the layer 2 address, the IPv4 address and the EUI-64 format IPv6 address held by the node.

At Step S14, the node information detection apparatus 2000 executes the One-shot RA processing. Then, the node information detection apparatus 2000 checks whether or not the node generates the IPv6 address in response to the One-shot RA processing. Specifically, the node information detection apparatus 2000 checks whether the node has transmitted the NS message or not.

When the node does not generate an IPv6 address in response to the One-shot RA processing, the node information detection processing proceeds to Step S16. In this case, the node information detection apparatus 2000 determines that the node has no default gateway set. Accordingly, the node information detection apparatus 2000 determines that the node cannot communicate with other node belonging to a sub-network different from the sub-network which the node belongs, by using IPv6.

On the other hand, when the node generates an IPv6 address in response to the One-shot RA processing, the node information detection processing proceeds to Step S24. In this case, the node information detection apparatus 2000 determines that the node is the IPv6 node. Further, the node information detection apparatus 2000 determines that the node has a default gateway set. Accordingly, the node information detection apparatus 2000 determines that the node can communicate with other nodes belonging to a sub-network which is different from the sub-network which the node belongs, by using IPv6.

At Step S16, the node information detection apparatus 2000 multicasts Echo Request messages of ICMPv6 to all the nodes. Then, the node information detection apparatus 2000 determines whether the node has responded to the Echo Request. This determination is made based on whether the node has transmitted an Echo Reply message of ICMPv6 to the node information detection apparatus 2000 or not. This processing is described in the Second Modified Example, as the processing which is executed by the node information detection apparatus 2000 of the Second Modified Example.

When the node does not respond to the Echo Request message of ICMPv6, the node detection processing proceeds to Step S18. On the other hand, when the node has responded to the Echo Request message of ICMPv6, the node detection processing proceeds to Step S22. In this case, the node information detection apparatus 2000 determines that the node is the IPv6 node and that the OS operating on the node is the Unix (registered trademark)-based OS.

In the following, description will be made of a case where the processing of the present Specific Example proceeds from Step S16 to Step S18. At Step S18, the node information detection apparatus 2000 determines whether the IPv6 address held by the node is detected at Step S12 or not. When the IPv6 address held by the node is not detected at Step S12, the node information detection apparatus 2000 determines that the node is not the IPv6 node, or that the OS operating on the node is the Windows (registered trademark) 7. When the OS operating on the node is the Windows (registered trademark) 7, and if OS setting is default setting, the node generates the address by the One-shot RA at Step S14. Therefore, when the OS operating on the node is the Windows (registered trademark) 7, the processing of the present Specific Example in many cases proceeds from Step S14 to Step S24. However, even when the OS operating on the node is the Windows (registered trademark) 7, the processing of the present Specific Example in some cases proceeds from Step S14 to Step S16.

On the other hand, when an IPv6 address held by the node is detected at Step S12, the processing of the present Specific Example proceeds to Step S20. In this case, the node information detection apparatus 2000 determines that the node is the IPv6 node and the OS is the Windows (registered trademark)-based OS.

At Step S20, the node information detection apparatus 2000 checks whether the node holds the EUI-64 (registered trademark) format IPv6 address or not. This is the processing described in First Modified Example as the processing executed by the node information detection apparatus 2000 of First Modified Example.

When the node holds the EUI-64 (registered trademark) format IPv6 address, the node information detection apparatus 2000 determines that the OS operating on the node is the Windows (registered trademark) XP. On the other hand, when the node does not hold the EUI-64 (registered trademark) format IPv6 address, the node information detection apparatus 2000 determines that the OS operating on the node is the Windows (registered trademark) 7.

In the following, description will be made of a case where the processing of the present Specific Example proceeds from Step S16 to Step S22. At Step S22, the node information detection apparatus 2000 multicasts NIQ messages of ICMPv6 to all the nodes. Then, the node information detection apparatus 2000 determines whether the node transmits a response message to the NIQ message to the node information detection apparatus 2000 or not. This processing described in the Second Modified Example as the processing executed by the node information detection apparatus 2000 of the Second Modified Example.

When the node has transmitted the response message to the node information detection apparatus 2000, the node information detection apparatus 2000 determines that the OS operating on the node is the BSD (registered trademark)-based OS. On the other hand, when the node fails to transmit the response message to the node information detection apparatus 2000, the node information detection apparatus 2000 determines that the OS operating on the node is the Linux (registered trademark)-based OS.

In the following, description will be made of a case where the node detection processing proceeds from Step S14 to Step S24. As described above, the node detection processing proceeds from Step S14 to Step S24 in a case where the node generates the IPv6 address upon the One-shot RA processing at Step S14.

In Step S24, the node information detection apparatus 2000 executes the sequential IPv6 address detection processing by using the IPv6 address of the node acquired by the One-shot RA processing at Step S14. The node information detection apparatus 2000 generates the candidate address to execute the sequential IPv6 address detection processing by using the above-described first method of generating the candidate address. Address information used by the node information detection apparatus 2000 here is the IPv6 address of the node which is acquired by the One-shot RA processing at Step S14. In other words, the node information detection apparatus 2000 uses the interface ID of the IPv6 address acquired by the One-shot RA processing as the interface ID of the candidate address. By the processing of Step S24, the node information detection apparatus 2000 further detects an IPv6 address held by the node.

At Step S26, the node information detection apparatus 2000 multicasts Echo Request messages of ICMPv6 to all the nodes. Then, the node information detection apparatus 2000 determines whether or not the node transmits the Echo Reply message in response to the Echo Request message to the node information detection apparatus 2000. The processing described in the Second Modified Example as processing executed by the node information detection apparatus 2000 of the Second Modified Example.

When the node does not transmit the Echo Reply message to the node information detection apparatus 2000, the node information detection processing proceeds to Step S28. In this case, the node information detection apparatus 2000 identifies that the OS operating on the node is the Windows (registered trademark)-based OS. Step S28 is the same processing as that of Step S20. Therefore, description thereof is omitted.

On the other hand, when the node transmits the Echo Reply message to the node information detection apparatus 2000, the node information detection processing proceeds to Step S30. In this case, the node information detection apparatus 2000 identifies that the OS operating on the node is the Unix (registered trademark)-based OS. Step S30 is the same processing as that of Step S22. Therefore, description thereof is omitted.

While the present invention has been described by using the drawings with respect to the Exemplary Embodiment and the Modified Examples in the foregoing, these are only illustrative description of the present invention. And a combination of the above Exemplary Embodiment and Modified Examples and various configurations other than the above Exemplary Embodiment and Modified Examples can be also adopted. The above-described Specific Example is only for illustrative of operation of the node information detection apparatus 2000. Therefore, operation of the node information detection apparatus 2000 is not limited to the operations recited in the above-described Specific Example.

This application claims priority from Japanese Patent Application No. 2013-040813, filed on Mar. 1, 2013, the disclosure of which is all incorporated herein.

The invention claimed is:

1. A node information detection apparatus comprising a processor and memory storing instructions that when executed by the processor allows:

a message transmission unit to transmit, onto a network, a transmission message that is responded to by a node through processing of IPv6 protocol stack that is implemented in at least one or more types of Operating Systems (OSs) operating on the node, the processing being executed at a kernel level of the OS;

a message reception unit to receive a response message to the transmission message from the node which received the transmission message; and an OS type identification unit to identify the type of OS operating on the node based on the contents of the response message transmitted by the node, or based on presence or absence of the response message from the node, wherein the message transmission unit transmits, as the transmission message, a Router Advertisement (RA) message being defined in IPv6 and being used for detecting an IPv6 address of the node which has the IPv6 address, and the message reception unit receives a response to the RA message to detect the IPv6 address of the node that transmits the response to the RA message, the message transmission unit further transmits, as the transmission message, at least one or more of an Echo Request message and a Node Information Query (NIQ) message of Internet Control Message Protocol Version 6 (ICMPv6), and the message reception unit receives a response to at least one or more of these messages, and the OS type identification unit identifies the type of OS operating on the node holding the IPv6 address obtained from the response to the RA message, based on whether the message reception unit receives the response to the ICMPv6 NIQ message from the node, and whether the message reception unit receives the response to the ICMPv6 Echo Request message from the node.

2. The node information detection apparatus according to claim 1, wherein the OS type identification unit identifies the type of OS operating on the node on the basis of a value of an interface ID of IPv6 indicated in the response message, the interface ID of IPv6 being held by the node.

3. The node information detection apparatus according to claim 1, wherein the OS type identification unit is further configured to execute at least one of:

first address generation processing for generating a candidate IPv6 address being a candidate of the unknown IPv6 address of the node, by merging an interface identifier (ID) of the IPv6 address of the node having known IPv6 address, and at least one known network prefix having been obtained in advance, second address generation processing for generating the candidate IPv6 address of the node, by merging the interface ID generated from a Media Access Control (MAC) address of the node having known MAC address, and the network prefix of the IPv6 address of the node having known IPv6 address, and third address generation processing for generating the candidate IPv6 address of the node, by merging the interface ID generated from a Media Access Control (MAC) address of the node having known MAC address, and at least one known network prefix having been obtained in advance, wherein the OS type identification unit generates the candidate IPv6 address by executing at least one of the first address generation processing, second address generation processing, and third address generation processing, and identifies the type of OS operating on the node holding the candidate IPv6 address being generated, based on whether the message reception unit receives the response to the ICMPv6 NIQ message from the node, and whether the message reception unit receives the response to the ICMPv6 Echo Request message from the node.

4. The node information detection apparatus according to claim 3, wherein the OS type identification unit further configured to execute at least the third address generation processing, wherein the message transmission unit transmits, as the transmission message, an Address Resolution Protocol (ARP) request defined in IPv4 used for resolving the MAC address of the host holding an IPv4 address, the message reception unit receives the response to the ARP request to detect the MAC address of the host, the OS type identification unit generates, as a first generated address, the candidate IPv6 address, by executing the third address generation processing using the MAC address being detected, when the response, from the node, to the RA message sent by the message transmission unit is not received by the message reception unit, the message transmission unit further performs multicast transmission of at least one or more of the ICMPv6 Echo Request message and the ICMPv6 NIQ message, and the message reception unit receives a response to at least one or more of these messages, the OS type identification unit identifies the type of OS operating on the node holding the first generated address, based on whether the message reception unit receives the response to the ICMPv6 NIQ message from the node, and whether the message reception unit receives the response to the ICMPv6 Echo Request message from the node.

5. The node information detection apparatus according to claim 4, wherein when the response, from the node, to the RA message sent by the message transmission unit is received by the message reception unit, the OS type identification unit generates, as a second generated address, the candidate IPv6 address, by executing the first address generation processing using the IPv6 address obtained from the response to the RA message, the message transmission unit further performs multicast transmission of at least one or more of the ICMPv6 Echo Request message and the ICMPv6 NIQ message, and the message reception unit receives a response to at least one or more of these messages, and the OS type identification unit identifies the type of OS operating on the node holding the second generated address, based on whether the message reception unit receives the response to the ICMPv6 NIQ message from the node, and whether the message reception unit receives the response to the ICMPv6 Echo Request message from the node.

6. A non-transitory computer-readable storage medium recorded with a computer program that allows a computer to function as a node information detection apparatus, the program allows the computer to execute:

a message transmission processing that transmits, onto a network, a transmission message to be responded to by a node through processing of IPv6 protocol stack that is implemented in at least one or more types of Operating Systems (OSs) operating on the node, the processing being executed at a kernel level of the OS;

a message reception processing that receives a response message to the transmission message from the node which received the transmission message; and an OS type identification processing that identifies a type of OS operating on the node on the basis of the contents of the response message transmitted by the node or on the basis of presence or absence of the response message from the node, wherein the message transmission processing transmits, as the transmission message, a Router Advertisement (RA) message being defined in IPv6 and being used for detecting an IPv6 address of the node which has the IPv6 address, and the message reception processing receives a response to the RA message to detect the IPv6 address of the node that transmits the response to the RA message, the message transmission processing further transmits, as the transmission message, at least one or more of an Echo Request message and a Node Information Query (NIQ) message of Internet Control Message Protocol Version 6 (ICMPv6), and the message reception processing receives a response to at least one or more of these messages, and the OS type identification processing identifies the type of OS operating on the node holding the IPv6 address obtained from the response to the RA message, based on whether the message reception processing receives the response to the ICMPv6 NIQ message from the node, and whether the message reception processing receives the response to the ICMPv6 Echo Request message from the node.

7. The non-transitory computer-readable storage medium recorded with the computer program according to claim 6, wherein the OS type identification processing identifies the type of OS operating on the basis of a value of an interface ID of IPv6 indicated in the response message, the interface ID of IPv6 being held by the node.

8. The non-transitory computer-readable storage medium recorded with the computer program according to claim 6, wherein
the OS type identification processing is further configured to execute at least one of:
first address generation processing for generating a candidate IPv6 address being a candidate of the unknown IPv6 address of the node, by merging an interface identifier (ID) of the IPv6 address of the node having known IPv6 address, and at least one known network prefix having been obtained in advance,
second address generation processing for generating the candidate IPv6 address of the node, by merging the interface ID generated from a Media Access Control (MAC) address of the node having known MAC address, and the network prefix of the IPv6 address of the node having known IPv6 address, and
third address generation processing for generating the candidate IPv6 address of the node, by merging the interface ID generated from a Media Access Control (MAC) address of the node having known MAC address, and at least one known network prefix having been obtained in advance, wherein
the OS type identification processing
generates the candidate IPv6 address by executing at least one of the first address generation processing, second address generation processing, and third address generation processing, and
identifies the type of OS operating on the node holding the candidate IPv6 address being generated, based on whether the message reception processing receives the response to the ICMPv6 NIQ message from the node, and whether the message reception processing receives the response to the ICMPv6 Echo Request message from the node.

9. The non-transitory computer-readable storage medium recorded with the computer program according to claim 8, wherein
the OS type identification processing further configured to execute at least the third address generation processing, wherein
the message transmission processing transmits, as the transmission message, an Address Resolution Protocol (ARP) request defined in IPv4 used for resolving the MAC address of the host holding an IPv4 address, the message reception processing receives the response to the ARP request to detect the MAC address of the host, the OS type identification processing generates, as a first generated address, the candidate IPv6 address, by executing the third address generation processing using the MAC address being detected,
when the response, from the node, to the RA message sent by the message transmission processing is not received by the message reception processing, the message transmission processing further performs multicast transmission of at least one or more of the ICMPv6 Echo Request message and the ICMPv6 NIQ message, and the message reception processing receives a response to at least one re more of these messages,
the OS type identification processing identifies the type of OS operating on the node holding the first generated address, based on whether the message reception processing receives the response to the ICMPv6 NIQ message from the node, and whether the message reception processing receives the response to the ICMPv6 Echo Request message from the node.

10. The non-transitory computer-readable storage medium recorded with the computer program according to claim 9, wherein
when the response, from the node, to the RA message sent by the message transmission processing is received by the message reception processing, the OS type identification processing generates, as a second generated address, the candidate IPv6 address, by executing the first address generation processing using the IPv6 address obtained from the response to the RA message,
the message transmission processing further performs multicast transmission of at least one or more of the ICMPv6 Echo Request message and the ICMPv6 NIQ message, and the message reception processing receives a response to at least one or more of these messages, and
the OS type identification processing identifies the type of OS operating on the node holding the second generated address, based on whether the message reception processing receives the response to the ICMPv6 NIQ message from the node, and whether the message reception processing receives the response to the ICMPv6 Echo Request message from the node.

11. A node information detection method to be executed by a computer, comprising:
transmitting, onto a network, a transmission message that is responded to by a node through processing of IPv6 protocol stack that is implemented in at least one or more types of Operating Systems (OSs) operating on the node, the processing being executed at a kernel level of the OS;
receiving a response message to the transmission message from the node which received the transmission message; and
identifying a type of OS operating on the node based on the contents of the response message transmitted by the node or based on presence or absence of the response message from the node, wherein
transmitting the transmission message includes transmitting a Router Advertisement (RA) message being defined in IPv6 and being used for detecting an IPv6 address of the node which has the IPv6 address, and receiving the response message includes receiving a response to the RA message to detect the IPv6 address of the node that transmits the response to the RA message,
transmitting the transmission message includes transmitting at least one or more of an Echo Request message and a Node Information Query (NIQ) message of Internet Control Message Protocol Version 6 (IC- MPv6), and receiving the response message includes receiving a response to at least one or more of these messages, and identifying the type of OS operating on the node including holding the IPv6 address obtained from the response to the RA message, based on whether receiving the response to the ICMPv6 NIQ message from the node, and whether receiving the response to the ICMPv6 Echo Request message from the node.

12. The node information detection method according to claim 11, wherein identifying the type of OS operating on the node includes, an operation to identify the type of OS operating on the node, on the basis of a value of an interface ID of IPv6 indicated in the response message, the interface ID of IPv6 being held by the node.

13. The node information detection method according to claim 11, wherein identifying the type of OS operating on the node includes at least one of:

first address generation processing for generating a candidate IPv6 address being a candidate of the unknown IPv6 address of the node, by merging an interface identifier (ID) of the IPv6 address of the node having known IPv6 address, and at least one known network prefix having been obtained in advance, second address generation processing for generating the candidate IPv6 address of the node, by merging the interface ID generated from a Media Access Control (MAC) address of the node having known MAC address, and the network prefix of the IPv6 address of the node having known IPv6 address, and third address generation processing for generating the candidate IPv6 address of the node, by merging the interface ID generated from a Media Access Control (MAC) address of the node having known MAC address, and at least one known network prefix having been obtained in advance, wherein identifying the type of OS operating on the node includes generating the candidate IPv6 address through at least one of the first address generation processing, second address generation processing, and third address generation processing, and identifying the type of OS operating on the node holding the candidate IPv6 address being generated, based on whether receiving the response to the ICMPv6 NIQ message from the node, and whether receiving the response to the ICMPv6 Echo Request message from the node.

14. The node information detection method according to claim 13, wherein identifying the type of OS operating on the node includes at least the third address generation processing, wherein transmitting the transmission message includes an Address Resolution Protocol (ARP) request defined in IPv4 used for resolving the MAC address of the host holding an IPv4 address, receiving the response to the ARP request to detect the MAC address of the host, identifying the type of OS operating on the node includes generating, as a first generated address, the candidate IPv6 address, by executing the third address generation processing using the MAC address being detected, when the response to the RA message is not received, transmitting the transmission message further includes performing multicast transmission of at least one or more of the ICMPv6 Echo Request message and the ICMPv6 NIQ message, and receiving the response includes receiving a response to at least one or more of these messages, identifying the type of OS operating on the node includes holding the first generated address, based on whether receiving the response to the ICMPv6 NIQ message from the node, and whether receiving the response to the ICMPv6 Echo Request message from the node.

15. The node information detection method according to claim 14, wherein when the response is received, identifying the type of OS operating on the node includes generating, as a second generated address, the candidate IPv6 address, by executing the first address generation processing using the IPv6 address obtained from the response to the RA message, transmitting the transmission message includes performing multicast transmission of at least one or more of the ICMPv6 Echo Request message and the ICMPv6 NIQ message, and receiving the response message includes receiving a response to at least one or more of these messages, and identifying the type of OS operating on the node includes holding the second generated address, based on whether receiving the response to the ICMPv6 NIQ message from the node, and whether receiving the response to the ICMPv6 Echo Request message from the node.

16. A node information detection apparatus comprising:

a message transmission means for transmitting, onto a network, a transmission message that is responded to by a node through processing of IPv6 protocol stack that is implemented in at least one or more types of Operating Systems (OSs) operating on the node, the processing being executed at a kernel level of the OS;

a message reception means for receiving a response message to the transmission message from the node which received the transmission message; and an OS type identification means for identifying the type of OS operating on the node based on the contents of the response message transmitted by the node, or based on presence or absence of the response message from the node, wherein the message transmission means transmits, as the transmission message, a Router Advertisement (RA) message being defined in IPv6 and being used for detecting an IPv6 address of the node which has the IPv6 address, and the message reception means receives a response to the RA message to detect the IPv6 address of the node that transmits the response to the RA message, the message transmission means transmits, as the transmission message, at least one or more of an Echo Request message and a Node Information Query (NIQ) message of Internet Control Message Protocol Version 6 (ICMPv6), and the message reception means receives a response to at least one or more of these messages, and, the OS type identification means identifies the type of OS operating on the node holding the IPv6 address obtained from the response to the RA message, based on whether the message reception means receives the response to the ICMPv6 NIQ message from the node, and whether the message reception means receives the response to the ICMPv6 Echo Request message from the node.

17. The node information detection apparatus according to claim 16, wherein the OS type identification means identifies the type of OS operating on the node on the basis of a value of an interface ID of IPv6 indicated in the response message, the interface ID of IPv6 being held by the node.

18. The node information detection apparatus according to claim 16 wherein
the OS type identification means includes at least one of:
first address generation processing for generating a candidate IPv6 address being a candidate of the unknown IPv6 address of the node, by merging an interface identifier (ID) of the IPv6 address of the node having known IPv6 address, and at least one known network prefix having been obtained in advance,
second address generation processing for generating the candidate IPv6 address of the node, by merging the interface ID generated from a Media Access Control (MAC) address of the node having known MAC address, and the network prefix of the IPv6 address of the node having known IPv6 address, and
third address generation processing for generating the candidate IPv6 address of the node, by merging the interface ID generated from a Media Access Control (MAC) address of the node having known MAC address, and at least one known network prefix having been obtained in advance, wherein
the OS type identification means
generates the candidate IPv6 address by executing at least one of the first address generation processing, second address generation processing, and third address generation processing, and
identifies the type of OS operating on the node holding the candidate IPv6 address being generated, based on whether the message reception means receives the response to the ICMPv6 NIQ message from the node, and whether the message reception means receives the response to the ICMPv6 Echo Request message from the node.

19. The node information detection apparatus according to claim 18 wherein
the OS type identification means further includes at least the third address generation processing, wherein
the message transmission means transmits, as the transmission message, an Address Resolution Protocol (ARP) request defined in IPv4 used for resolving the MAC address of the host holding an IPv4 address, the message reception means receives the response to the ARP request to detect the MAC address of the host,
the OS type identification means generates, as a first generated address, the candidate IPv6 address, by executing the third address generation processing using the MAC address being detected,
when the response, from the node, to the RA message sent by the message transmission means is not received by the message reception means, the message transmission means further performs multicast transmission of at least one or more of the ICMPv6 Echo Request message and the ICMPv6 NIQ message, and the message reception means receives a response to at least one or more of these messages,
the OS type identification means identifies the type of OS operating on the node holding the first generated address, based on whether the message reception means receives the response to the ICMPv6 NIQ message from the node, and whether the message reception means receives the response to the ICMPv6 Echo Request message from the node.

20. The node information detection apparatus according to claim 19 wherein,
when the response, from the node, to the RA message sent by the message transmission means is received by the message reception means, the OS type identification means generates, as a second generated address, the candidate IPv6 address, by executing the first address generation processing using the IPv6 address obtained from the response to the RA message,
the message transmission means further performs multicast transmission of at least one or more of the ICMPv6 Echo Request message and the ICMPv6 NIQ message, and the message reception means receives a response to at least one or more of these messages, and
the OS type identification means identifies the type of OS operating on the node holding the second generated address, based on whether the message reception means receives the response to the ICMPv6 NIQ message from the node, and whether the message reception means receives the response to the ICMPv6 Echo Request message from the node.

* * * * *